United States Patent
Yamada

(10) Patent No.: US 9,201,221 B2
(45) Date of Patent: Dec. 1, 2015

(54) WIDE-ANGLE PROJECTION LENS AND PROJECTION DISPLAY DEVICE USING THE SAME

(71) Applicant: FUJIFILM Corporation, Tokyo (JP)

(72) Inventor: Hiroshi Yamada, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 248 days.

(21) Appl. No.: 14/064,961

(22) Filed: Oct. 28, 2013

(65) Prior Publication Data

US 2014/0049835 A1 Feb. 20, 2014

Related U.S. Application Data

(63) Continuation of application No. PCT/JP2012/002984, filed on May 7, 2012.

(30) Foreign Application Priority Data

May 12, 2011 (JP) ................. 2011-107114

(51) Int. Cl.
| | |
|---|---|
| *G02B 13/18* | (2006.01) |
| *G02B 13/04* | (2006.01) |
| *G02B 13/16* | (2006.01) |
| *G02B 13/22* | (2006.01) |

(52) U.S. Cl.
CPC ............ *G02B 13/04* (2013.01); *G02B 13/16* (2013.01); *G02B 13/18* (2013.01); *G02B 13/22* (2013.01)

(58) Field of Classification Search
CPC ...... G02B 15/177; G02B 13/16; G02B 13/18; G02B 9/34; G02B 27/18
USPC ............... 359/649, 686, 708, 754, 650, 15
See application file for complete search history.

(56) References Cited

U.S. PATENT DOCUMENTS

| | | | |
|---|---|---|---|
| 7,586,690 B2 * | 9/2009 | Yamada | 359/680 |
| 2009/0109543 A1 | 4/2009 | Nagatoshi | |
| 2010/0053570 A1 * | 3/2010 | Amano et al. | 353/85 |
| 2011/0249344 A1 * | 10/2011 | Nagatoshi et al. | 359/682 |

FOREIGN PATENT DOCUMENTS

| | | |
|---|---|---|
| JP | 2007-147970 | 6/2007 |
| JP | 2007-256712 | 10/2007 |
| JP | 2009-104048 | 5/2009 |
| JP | 2010-085732 | 4/2010 |

OTHER PUBLICATIONS

International Search Report, PCT/JP2012/002984, Jul. 17, 2012.

* cited by examiner

*Primary Examiner* — Ricky Mack
*Assistant Examiner* — Daniele Manikeu
(74) *Attorney, Agent, or Firm* — Young & Thompson

(57) ABSTRACT

A first lens group including two aspherical lenses, a second lens group consisting of three negative meniscus lenses, each negative meniscus lens having a convex surface facing the enlargement side, a third lens group having a negative refractive power and including at least one cemented lens, and a fourth lens group having a positive refractive power and including at least two cemented lenses and one aspherical lens are arranged in this order from the enlargement side. Predetermined conditional expressions are satisfied.

13 Claims, 22 Drawing Sheets

WIDE-ANGLE PROJECTION LENS AND PROJECTION DISPLAY DEVICE USING THE SAME

CROSS REFERENCE TO RELATED APPLICATIONS

This application is a Bypass continuation of PCT/JP2012/002984 filed on May 7, 2012, which claims foreign priority to Japanese Application No. 2011-107114 filed on May 12, 2011. The entire contents of each of the above applications are hereby incorporated by reference.

TECHNICAL FIELD

The present invention relates to a wide-angle projection lens and a projection display device, and in particular to a wide-angle projection lens that is suitable for use with a projector device equipped with a light valve, such as a liquid crystal display element or DMD (Digital Micromirror Device®), and a projection display device using the wide-angle projection lens.

BACKGROUND ART

Conventionally, projector devices (projection display devices) using a light valve, such as a liquid crystal display element or DMD, are widely used. It is required for a projection lens for use with such a projection display device to have a small f-number, to have a long back focus so that a color combining prism, or the like, can be disposed, to be substantially telecentric at the reduction side, and to have high optical performance that is appropriate for the resolution of the light valve. Examples of conventionally known projection lenses are disclosed, for example, in Japanese Unexamined Patent Publication Nos. 2007-147970, 2007-256712 and 2010-085732 (hereinafter, Patent Documents 1 to 3).

DISCLOSURE OF INVENTION

In recent years, there are increasing demands for wider-angle projection lenses, such as one having a wide angle of view with a total angle of view of 130 degrees or more, for example. While the projection lenses disclosed in Patent Documents 1 to 3 are intended to have a wide angle of view, none of them are deemed to accommodate a wide angle with a total angle of view of 130 degrees or more.

In view of the above-described circumstances, the present invention is directed to providing a wide-angle projection lens having a wide angle of view with a total angle of view of 130 degrees or more, having a small f-number, having a long back focus, achieving size reduction and cost reduction and having successfully corrected aberrations, and a projection display device employing the wide-angle projection lens.

The wide-angle projection lens of the invention substantially consists of, in order from the enlargement side: a first lens group including two aspherical lenses; a second lens group consisting of three negative meniscus lenses, each negative meniscus lens having a convex surface facing the enlargement side; a third lens group having a negative refractive power and including at least one cemented lens; and a fourth lens group having a positive refractive power and including at least two cemented lenses and one aspherical lens, wherein an interval between the third lens group and the fourth lens group is the longest interval among intervals between the lens groups next to each other of the entire system, and conditional expressions (1) to (3) below are satisfied:

$$-3.8 < f123/f < -1.6 \quad (1),$$

$$6.6 < f4/f < 11.5 \quad (2) \text{ and}$$

$$5.1 < Bf/f < 6.4 \quad (3),$$

where f123 is a combined focal length of the first to the third lens groups, f is a focal length of the entire system, f4 is a focal length of the fourth lens group, and Bf is a back focus, which is an equivalent air distance, at the reduction side.

In the wide-angle projection lens of the invention, it is preferable that at least one or any combination of conditional expressions (4) to (6) below are satisfied:

$$2.0 < f2/f123 < 3.8 \quad (4),$$

$$4.8 < f3/f123 < 11.3 \quad (5) \text{ and}$$

$$4.0 < d_{3-4}/f < 12.0 \quad (6),$$

where f2 is a focal length of the second lens group, f3 is a focal length of the third lens group, and $d_{3-4}$ is an interval between the third lens group and the fourth lens group along the optical axis when the projection distance is infinity.

In the wide-angle projection lens of the invention, it is preferable that the fourth lens group includes three or more positive lenses made of a material having an Abbe number of 80 or more with respect to the d-line.

In the wide-angle projection lens of the invention, it is preferable that focus control when the projection distance is changed is achieved by moving only the second lens group and the third lens group in the optical axis direction, and focus control when the projection distance is changed from a far distance to a near distance is achieved by moving the second lens group toward the reduction side and moving the third lens group toward the enlargement side.

The projection display device of the invention includes: a light source; a light valve; an illumination optical unit for guiding a light flux from the light source to the light valve; and the above-described wide-angle projection lens, wherein the light flux from the light source is subjected to optical modulation by the light valve and is projected onto a screen by the wide-angle projection lens.

It should be noted that the "enlargement side" herein refers to a side where an image is projected (screen side), and the screen side is referred to as the enlargement side even when a reduced image is projected for the sake of convenience. On the other hand, the "reduction side" herein refers to an original image display area side (light valve side), and the light valve side is referred to as the reduction side even when a reduced image is projected for the sake of convenience.

It should be noted that the symbol (positive or negative) with respect to the surface shape and the refractive power of the lenses of the above-described wide-angle projection lens of the invention is that of the paraxial region.

It should be noted that the "lens group" herein may not necessarily include a plurality of lenses and there may be a lens group including only one lens.

In the wide-angle projection lens having a four-group configuration according to the invention, the configurations of the individual lens groups are suitably set and are configured to satisfy the conditional expressions (1) to (3). This allows providing a wide-angle projection lens having a wide angle of view with a total angle of view of 130 degrees or more, having a small f-number, having a long back focus, can achieve size reduction and cost reduction, and can achieve successful correction of aberrations, as well as a projection display device employing the wide-angle projection lens.

DESCRIPTION OF PREFERRED EMBODIMENTS

Figure 1:
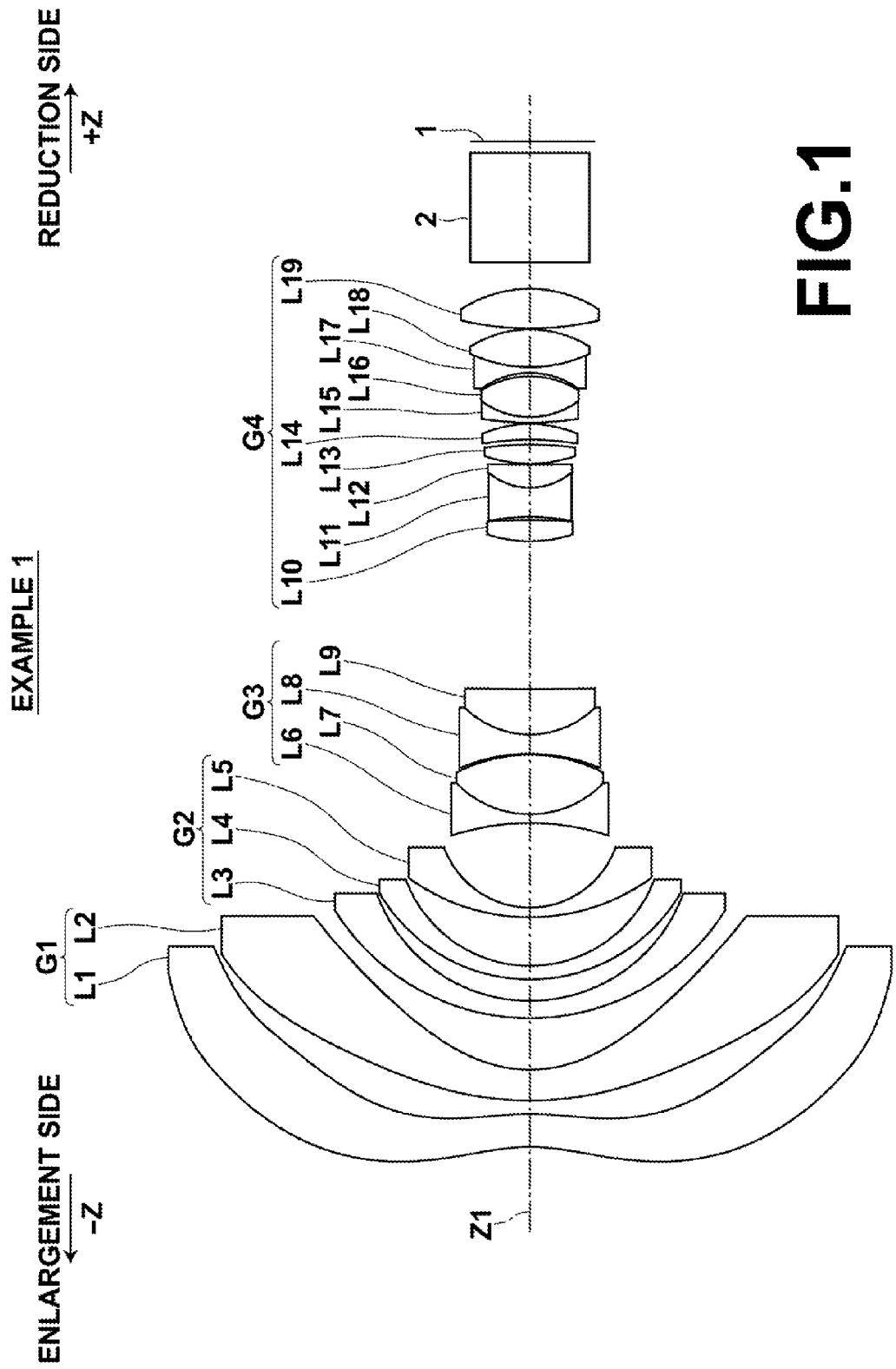
FIG. 1 is a sectional view illustrating the lens configuration of a wide-angle projection lens of Example 1 of the invention.

Hereinafter, embodiments of the present invention will be described in detail with reference to the drawings. FIGS. 1 to 7 are sectional views illustrating configuration examples of a wide-angle projection lens according to an embodiment of the invention, and correspond to wide-angle projection lenses of Examples 1 to 7, respectively, which will be described later. The examples shown in FIGS. 1 to 7 have the same basic configuration and are shown in the same manner in the drawings. Therefore, the wide-angle projection lens according to the embodiment of the invention is described mainly with reference to FIG. 1.

The wide-angle projection lens according to this embodiment shown in FIG. 1 is formed by four lens groups including, in order from the enlargement side (the side indicated by the arrow −Z in the drawing) to the reduction side (the side indicated by the arrow +Z in the drawing) along the optical axis Z1, a first lens group G1, a second lens group G2, a third lens group G3 and a fourth lens group G4. It should be noted that, in the example shown in FIG. 1, a glass block (including a filtering section) 2 mainly formed by a color combining prism and an image display surface 1 of a light valve, such as a liquid crystal display element or DMD, are disposed on the reduction side of the wide-angle projection lens.

The first lens group G1 includes two aspherical lenses. The first lens group G1 at the most enlargement-side position including at least two aspherical lenses is advantageous in accomplishing a wider-angle lens having a small f-number. Each aspherical lens has at least one aspherical surface. It is advantageous in achieving successful aberration correction that both sides of each aspherical lens are aspherical surfaces.

In view of providing a wider angle of view, it is preferable that the first lens group G1 has a negative refractive power. For example, the first lens group G1 shown in FIG. 1 is formed by two lenses L1 and L2, each of which has a negative meniscus shape in the paraxial region. In the case where the first lens group G1 includes two lenses having negative meniscus shapes in the paraxial region, it is preferable that one of the lenses has a shape with the convex surface facing the reduction side in the paraxial region and the other of the lenses has a shape with the convex surface facing the enlargement side in the paraxial region.

It should be noted that, in a case where importance is placed on size reduction and cost reduction, it is preferable that the first lens group G1 has a two-lens configuration, as described above. However, the first lens group G1 may have a three-lens configuration that further includes a lens that also has a protective function disposed on the enlargement side of the above-described two lenses.

The second lens group G2 has a negative refractive power as a whole. As shown in FIG. 1, the second lens group G2 is formed by three negative meniscus lenses L3, L4 and L5 with convex surfaces thereof facing the enlargement side. With this configuration, the negative refractive power of the second lens group G2 can be distributed among the three single lenses having negative meniscus shapes, and this allows gradually bending light beams, thereby suppressing occurrence of coma aberration and image plane curve.

The third lens group G3 has a negative refractive power as a whole. The third lens group G3 includes at least one cemented lens formed by a positive lens and a negative lens cemented together. The third lens group G3 including a cemented lens allows successful correction of longitudinal chromatic aberration and lateral chromatic aberration. The third lens group G3 including two cemented lenses is more advantageous in the correction of longitudinal chromatic aberration and lateral chromatic aberration.

For example, the third lens group G3 shown in FIG. 1 has a four-lens configuration including, in order from the enlargement side, a cemented lens formed by a lens L6 that is a biconcave lens and a lens L7 that is a biconvex lens cemented together, and a cemented lens formed by a lens L8 that is a biconcave and a lens L9 that is a positive lens cemented together. However, the third lens group G3 may have a five-lens configuration including a biconcave lens, a biconvex lens, a positive meniscus lens, and a cemented lens formed by a biconcave lens and a biconvex lens cemented together. The third lens group G3 including at least two positive lenses and at least two negative lenses allows successful correction of longitudinal chromatic aberration and lateral chromatic aberration.

The fourth lens group G4 has a positive refractive power as a whole. The fourth lens group G4 includes at least two cemented lenses and one aspherical lens. Each cemented lens included in the fourth lens group G4 is formed by at least one positive lens and at least one negative lens cemented together. The fourth lens group G4 including at least two cemented lenses allows successful correction of longitudinal chromatic aberration and lateral chromatic aberration. It is preferable that the fourth lens group G4 includes three or more cemented surfaces where each positive lens and each negative lens are cemented together. This configuration is more advantageous in the correction of longitudinal chromatic aberration and lateral chromatic aberration. Further, the fourth lens group G4 including the aspherical lens allows successful correction of aberrations.

Further, it is preferable that the fourth lens group includes three or more positive lenses that are made of a material having an Abbe number of 80 or more with respect to the d-line. The fourth lens group G4 that is a positive lens group, includes at least two cemented lenses and one aspherical lens, and further includes three or more positive lenses having an Abbe number of 80 or more allows ensuring the back focus, optimizing the size of the entire lens system, and achieving successful correction of aberrations including the longitudinal chromatic aberration and the lateral chromatic aberration at the same time.

The fourth lens group G4 may have a ten-lens configuration, as in the example shown in FIG. 1, for example, which includes, in order from the enlargement side, a lens L10 that is a biconvex lens, a cemented lens formed by a lens L11 that is a biconcave lens and a lens L12 that is a positive lens cemented together, a lens L13 that is a biconvex lens, a lens L14 having a positive meniscus shape in the paraxial region, a cemented lens formed by a lens L15 that is a negative meniscus lens and a lens L16 that is a biconvex lens cemented together, a cemented lens formed by a lens L17 that is a biconcave lens and a lens L18 that is a biconvex lens cemented together, and a lens L19 that is a biconvex lens.

The interval between the third lens group G3 and the fourth lens group G4 along the optical axis is configured to be the longest interval among intervals along the optical axis between the lens groups next to each other of the entire system. This facilitates disposing an aperture stop, a light flux separating/combining member, etc., between the third lens group G3 and the fourth lens group G4.

The wide-angle projection lens according to this embodiment is configured to satisfy conditional expressions (1) to (3) below:

$$-3.8 < f123/f < -1.6 \quad (1),$$

$$6.6 < f4/f < 11.5 \quad (2) \text{ and}$$

$$5.1 < Bf/f < 6.4 \quad (3),$$

where f123 is a combined focal length of the first to the third lens groups G1 to G3, f is a focal length of the entire system, f4 is a focal length of the fourth lens group G4, and Bf is a back focus (equivalent air distance) at the reduction side.

A wide-angle lens like the wide-angle lens of this embodiment has a negative combined refractive power from the first lens group G1 to the third lens group G3. If the lower limit of the conditional expression (1) is not reached, the combined focal length of the first to the third lens groups G1 to G3 becomes long and the combined refractive power from the first lens group G1 to the third lens group G3 becomes weak, and it is difficult to ensure the back focus. If the upper limit of the conditional expression (1) is exceeded, the combined focal length of the first to the third lens groups G1 to G3 becomes short and amounts of coma aberration, image plane curve and astigmatic difference become large, and it is difficult to achieve successful correction of aberrations.

If the lower limit of the conditional expression (2) is not reached, the focal length of the fourth lens group G4 becomes short, and it is difficult to ensure the back focus and achieve correction of aberrations. If the upper limit of the conditional expression (2) is exceeded, the size of the entire lens system becomes large, and increase of the diameter leads to cost increase.

If the lower limit of the conditional expression (3) is not reached, the back focus becomes short, and it is difficult to dispose the color combining prism, etc. If the upper limit of the conditional expression (3) is exceeded in a state where a sufficient back focus is ensured, the focal length of the entire system becomes short and it is difficult to achieve correction of aberrations.

Further, it is preferable that the wide-angle projection lens of this embodiment selectively has the features described below, as appropriate. As preferred aspects, the wide-angle projection lens of this embodiment may have one of or any combination of the features described below.

It is preferable that conditional expression (4) below is satisfied:

$$2.0 < f2/f123 < 3.8 \quad (4),$$

where f2 is a focal length of the second lens group G2, and f123 is a combined focal length of the first to the third lens groups G1 to G3.

If the lower limit of the conditional expression (4) is not reached, amounts of coma aberration and image plane curve become large. If the upper limit of the conditional expression (4) is exceeded, the diameter of the most enlargement-side lens of the first lens group G1 becomes large.

It is preferable that conditional expression (5) below is satisfied:

$$4.8 < f3/f123 < 11.3 \quad (5),$$

where f3 is a focal length of the third lens group G3, and f123 is a combined focal length of the first to the third lens groups G1 to G3.

If the lower limit of the conditional expression (5) is not reached, the sizes of the first lens group G1 and the second lens group G2 become large, and increase of the diameter leads to cost increase. If the upper limit of the conditional expression (5) is exceeded, it is difficult to ensure the back focus.

It is preferable that conditional expression (6) below is satisfied:

$$4.0 < d_{3-4}/f < 12.0 \quad (6),$$

where $d_{3-4}$ is an interval between the third lens group G3 and the fourth lens group G4 along the optical axis when the projection distance is infinity, and f is a focal length of the entire system.

The conditional expression (6) relates to the longest lens group interval among the lens group intervals of the entire system. If the lower limit of the conditional expression (6) is not reached, it is difficult to achieve successful correction of aberrations and to ensure the back focus. If the upper limit of the conditional expression (6) is exceeded, the size of the lens system becomes large.

In view of the above-described circumstances, it is more preferable that conditional expressions (1-1) to (6-1) below are satisfied in place of the conditional expressions (1) to (6), respectively:

$$-3.2 < f123/f < -1.8 \quad (1\text{-}1),$$

$$7.2 < f4/f < 9.4 \quad (2\text{-}1),$$

$$5.2 < Bf/f < 5.9 \quad (3\text{-}1),$$

$$2.2 < f2/f123 < 3.2 \quad (4\text{-}1),$$

$$5.4 < f3/f123 < 9.6 \quad (5\text{-}1) \text{ and}$$

$$4.4 < d_{3\text{-}4}/f < 9.8 \quad (6\text{-}1).$$

Further, it is preferable that the wide-angle projection lens of this embodiment is configured such that focus control is achieved by moving the second lens group G2 and third lens group G3 in the optical axis direction, and focus control when the projection distance is changed from a far distance to a near distance is achieved by moving the second lens group G2 toward the reduction side and the third lens group G3 toward enlargement side. According to this method, the focusing mechanism can be simplified and cost reduction can be achieved when compared to a method where the focus control is achieved by moving the entire lens system or a method where the focus control is achieved by moving the lens groups including the first lens group G1 formed by the lenses having large diameters.

Further, in the case where the wide-angle projection lens according to this embodiment is mounted on a projection display device, a liquid crystal display element may be used as a light valve, and/or a PBS (Polarized Beam Splitter) prism and a color combining prism may be disposed as a light flux separating optical system and a light flux combining optical system on the reduction side of the wide-angle projection lens. Therefore, it is preferable that the wide-angle projection lens of this embodiment is telecentric at the reduction side.

According to the above-described wide-angle projection lens of this embodiment, a projection lens having a wide angle of view of 130 degrees or more, having a small f-number of F1.8 to F2.0, being substantially telecentric at the reduction side, having a long back focus, achieving size reduction and cost reduction, and achieving successful correction of aberrations can be accomplished.

Figure 22:
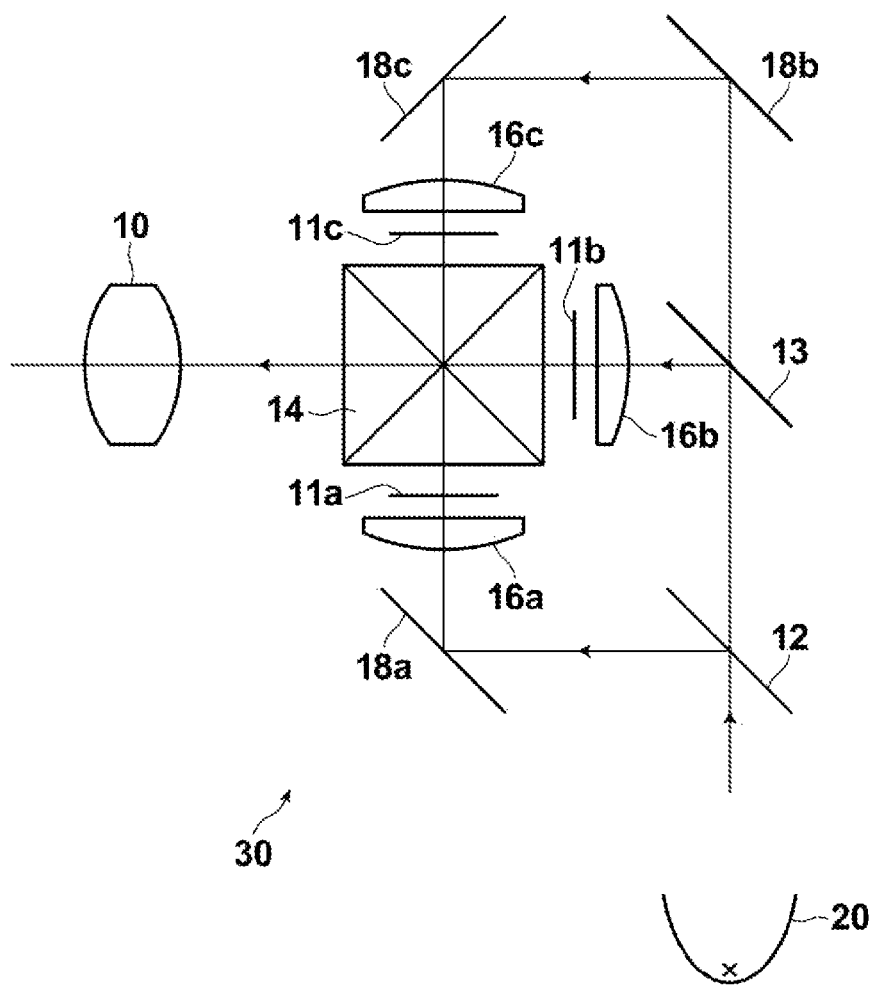
FIG. 22 is a schematic configuration diagram of a projection display device according to one embodiment of the invention.

Next, a projection display device equipped with the above-described wide-angle projection lens is described. FIG. 22 is a schematic configuration diagram of a projection display device according to one embodiment of the invention.

The projection display device shown in FIG. 22 includes a light source 20, transmissive liquid crystal display panels 11a to 11c serving as light valves corresponding to light of individual colors, and an illumination optical unit 30 for guiding a light flux from the light source 20 to the light valves. The illumination optical unit 30 includes dichroic mirrors 12 and 13 for color separation, a cross dichroic prism 14 for color composition, condenser lenses 16a to 16c, and total reflection mirrors 18a to 18c. It should be noted that a structure between the light source 20 and the dichroic mirror 12 is omitted in FIG. 22.

White light from the light source 20 is separated into light fluxes of three colors (G light, B light and R light) by the dichroic mirrors 12 and 13 in the illumination optical unit 30, and then the optical paths of the light fluxes are deflected by the total reflection mirrors 18a to 18c so that the light fluxes travel through the condenser lenses 16a to 16c and enter the transmissive liquid crystal display panels 11a to 11c corresponding to the light fluxes of individual colors, where the light fluxes are subjected to optical modulation, then subjected to color composition by the cross dichroic prism 14, and then enter the wide-angle projection lens 10 to be projected onto a screen (not shown) by the wide-angle projection lens 10. It should be noted that, in FIG. 22, the wide-angle projection lens 10 is schematically shown.

Next, numerical examples of the wide-angle projection lens of the invention are described.

EXAMPLE 1

The configuration of the wide-angle projection lens of Example 1 is as shown in FIG. 1. The wide-angle projection lens of Example 1 includes, in order from the enlargement side, the first lens group G1 having a negative refractive power, the second lens group G2 having a negative refractive power, the third lens group G3 having a negative refractive power, and the fourth lens group G4 having a positive refractive power. The wide-angle projection lens is substantially telecentric at the reduction side. The glass block (including a filtering section) 2 mainly formed by a color combining prism and the image display surface 1 of the light valve are disposed on the reduction side of the wide-angle projection lens.

The first lens group G1 includes, in order from the enlargement side, a lens L1 having a negative meniscus shape with the convex surface facing the reduction side in the paraxial region, and a lens L2 having a negative meniscus shape with the convex surface facing the enlargement side in the paraxial region. Both surfaces of the lens L1 and both surfaces of the lens L2 are aspherical surfaces.

The second lens group G2 includes three lenses L3 to L5, each having a negative meniscus shape with the convex surface facing the enlargement side.

The third lens group G3 includes, in order from the enlargement side, a cemented lens formed by a lens L6 having a biconcave shape and a lens L7 having a biconvex shape cemented together, and a cemented lens formed by a lens L8 having a biconcave shape and a lens L9 having a positive meniscus shape with the convex surface facing the enlargement side cemented together.

The fourth lens group G4 includes, in order from the enlargement side, a lens L10 having a biconvex shape, a cemented lens formed by a lens L11 having a biconcave shape and a lens L12 having a positive meniscus shape with the convex surface facing the enlargement side cemented together, a lens L13 having a biconvex shape, a lens L14 having a positive meniscus shape with the convex surface facing the reduction side in the paraxial region, a cemented lens formed by a lens L15 having a negative meniscus shape with the convex surface facing the enlargement side and a lens L16 having a biconvex shape cemented together, a cemented lens formed by a lens L17 having a biconcave shape and a lens L18 having a biconvex shape cemented together, and a lens L19 having a biconvex shape. Both surfaces of the lens L14 are aspherical surfaces.

This wide-angle projection lens is configured such that focus control is achieved by moving the second lens group G2 and third lens group G3 in the optical axis direction, and focus control when the projection distance is changed from a far distance to a near distance is achieved by moving the second lens group G2 toward the reduction side and the third lens group G3 toward enlargement side.

Basic lens data of the wide-angle projection lens of Example 1 is shown at the upper portion of Table 1. The data shown in Table 1 includes data of the glass block. In Table 1, each value in the column of "Si" represents the surface number of the i-th (i=1, 2, 3, . . . ) surface, where the enlargement-side surface of the most enlargement-side element (lens or glass block) is the 1st surface and the number is sequentially increased toward the reduction side. Each value in the column of "Ri" represents the radius of curvature of the i-th surface. Each value in the column of "Di" represents the surface interval between the i-th surface and the i+1-th surface along the optical axis Z1. Each value in the column of "Ndj" represents the refractive index with respect to the d-line (wavelength of 587.6 nm) of the j-th (j=1, 2, 3, . . . ) element, where the most enlargement-side element is the 1st element and the number is sequentially increased toward the reduction side. Each value in the column of "νdj" represents the Abbe number with respect to the d-line of the j-th element.

It should be noted that the symbol with respect to the radius of curvature means that a surface shape that is convex toward the enlargement side is positive and a surface shape that is convex toward the reduction side is negative. The lowermost numerical value in the column of "Di" represents a distance from the reduction-side surface of the glass block to the image display surface 1. The interval between the first lens group G1 and the second lens group G2, the interval between the second lens group G2 and the third lens group G3, and the interval between the third lens group G3 and the fourth lens group G4 change depending on the projection distance, and the values shown in parentheses at the positions of D4, D10 and D16 corresponding to these intervals are intervals when the projection distance is infinity. Values of the intervals D4, D10 and D16 when the projection distance is 1250 mm, 630 mm, and 460 mm are shown at the lower portion of Table 1.

In the table showing the basic lens data of Table 1, each aspherical surface is indicated by the symbol "*" added to the surface number thereof, and a numerical value of a paraxial radius of curvature is shown as the radius of curvature of each aspherical surface. Table 2 shows aspherical coefficients of each aspherical surface of the wide-angle projection lens of Example 1, where "E-n" (where n is an integer) following each numerical value of the aspherical coefficient shown in Table 2 means "×10$^{-n}$", and "E+n" means "×10$^{n}$". The aspherical coefficients are values of coefficients K and $A_m$ (where m=3, 4, 5, . . . , 20) in the aspherical surface equation below:

$$zd = \frac{C \times Y^2}{1 + \sqrt{1 - K \times C^2 \times Y^2}} + \sum_m A_m Y^m,$$

where Zd is a length of a perpendicular line from a point at a distance Y from the optical axis on the aspherical surface to a plane tangent to the apex of the aspherical surface (a plane perpendicular to the optical axis), Y is a distance from the optical axis, C is a curvature in the vicinity of the optical axis, and K and $A_m$ are aspherical coefficients (where m=3, 4, 5, . . . , 20).

TABLE 1

| Example 1 | | | | |
|---|---|---|---|---|
| Si | Ri | Di | Ndj | νdj |
| *1 | −39.954 | 7.50 | 1.49100 | 57.6 |
| *2 | −60.858 | 3.15 | | |
| *3 | 75.947 | 7.00 | 1.49100 | 57.6 |
| *4 | 30.103 | (10.63) | | |
| 5 | 52.508 | 3.95 | 1.72916 | 54.7 |
| 6 | 37.163 | 4.89 | | |
| 7 | 39.740 | 3.10 | 1.61800 | 63.3 |
| 8 | 30.236 | 11.07 | | |
| 9 | 47.036 | 2.20 | 1.77250 | 49.6 |
| 10 | 20.763 | (21.60) | | |
| 11 | −57.085 | 2.00 | 1.84666 | 23.8 |
| 12 | 23.161 | 13.59 | 1.72047 | 34.7 |
| 13 | −36.458 | 0.20 | | |
| 14 | −40.792 | 4.40 | 1.69680 | 55.5 |
| 15 | 20.904 | 10.35 | 1.80610 | 33.3 |
| 16 | 879.645 | (32.60) | | |
| 17 | 31.113 | 4.85 | 1.84666 | 23.8 |
| 18 | −140.793 | 0.72 | | |
| 19 | −49.049 | 6.63 | 1.83481 | 42.7 |
| 20 | 14.754 | 5.26 | 1.60342 | 38.0 |
| 21 | 311.647 | 0.21 | | |
| 22 | 31.325 | 4.39 | 1.49700 | 81.5 |
| 23 | −75.721 | 1.11 | | |
| *24 | −65.058 | 3.59 | 1.51007 | 56.2 |
| *25 | −26.267 | 0.30 | | |
| 26 | 71.641 | 1.25 | 1.83481 | 42.7 |
| 27 | 18.511 | 9.30 | 1.49700 | 81.5 |
| 28 | −20.796 | 0.80 | | |
| 29 | −18.787 | 1.30 | 1.80000 | 29.8 |
| 30 | 31.726 | 8.61 | 1.49700 | 81.5 |
| 31 | −25.497 | 0.20 | | |
| 32 | 67.987 | 9.05 | 1.49700 | 81.5 |
| 33 | −28.748 | 9.14 | | |
| 34 | ∞ | 25.00 | 1.51680 | 64.2 |
| 35 | ∞ | 0.01 | | |

| Projection distance (mm) | 1250 | 630 | 460 |
|---|---|---|---|
| D4 | 11.29 | 11.76 | 12.14 |
| D10 | 20.29 | 19.30 | 18.50 |
| D16 | 33.25 | 33.77 | 34.19 |

TABLE 2

| | Example 1 | | | | | |
|---|---|---|---|---|---|---|
| | 1st surface | 2nd surface | 3rd surface | 4th surface | 24th surface | 25th surface |
| K | −1.12300E−01 | −2.79783E+00 | 3.00000E−07 | −1.00000E−07 | 1.00000E+00 | 1.00000E+00 |
| A3 | 1.24438E−04 | 1.14607E−04 | 3.89194E−06 | 2.31288E−05 | 0.00000E+00 | 0.00000E+00 |
| A4 | 1.76393E−05 | 1.42060E−05 | 1.44302E−06 | −3.68041E−07 | −2.59351E−05 | −1.53198E−05 |
| A5 | −5.56037E−07 | −3.78250E−07 | −5.59110E−08 | −5.62110E−08 | 4.75779E−06 | 6.57667E−06 |
| A6 | 1.91040E−09 | 7.68102E−10 | −1.04839E−11 | 8.34220E−11 | −1.42727E−07 | −6.85448E−07 |
| A7 | 1.77257E−10 | 3.79499E−11 | 1.28713E−11 | 2.56072E−11 | −4.41534E−08 | 1.21106E−08 |
| A8 | −2.27105E−12 | 3.06278E−13 | −1.60829E−14 | −2.59905E−13 | 7.80095E−09 | 5.86530E−09 |
| A9 | −2.39691E−14 | 1.50931E−14 | −1.76075E−15 | −6.28720E−16 | −6.03164E−10 | −6.91668E−10 |
| A10 | 5.39789E−16 | −3.45604E−16 | 1.50409E−17 | 1.00677E−17 | 2.00483E−11 | 2.48171E−11 |
| A11 | 1.56622E−18 | −1.30153E−17 | −1.24345E−19 | 2.03871E−20 | | |
| A12 | −8.07393E−20 | 3.22119E−19 | 1.18328E−21 | 1.35972E−21 | | |
| A13 | 4.28499E−22 | −1.84015E−21 | | | | |

It should be noted that the unit of the length in the basic lens data is millimeter; however, since optical systems can be used with being proportionally enlarged or reduced, any other suitable units may be used. The numerical values shown in all the tables are rounded at predetermined decimal places. The above-described symbols, meanings and manners of description of each table basically apply also to Tables 3 to 14 corresponding to Examples 2 to 7, and therefore the same explanations are not repeated for Tables 3 to 14 shown below.

EXAMPLE 2

Figure 2:
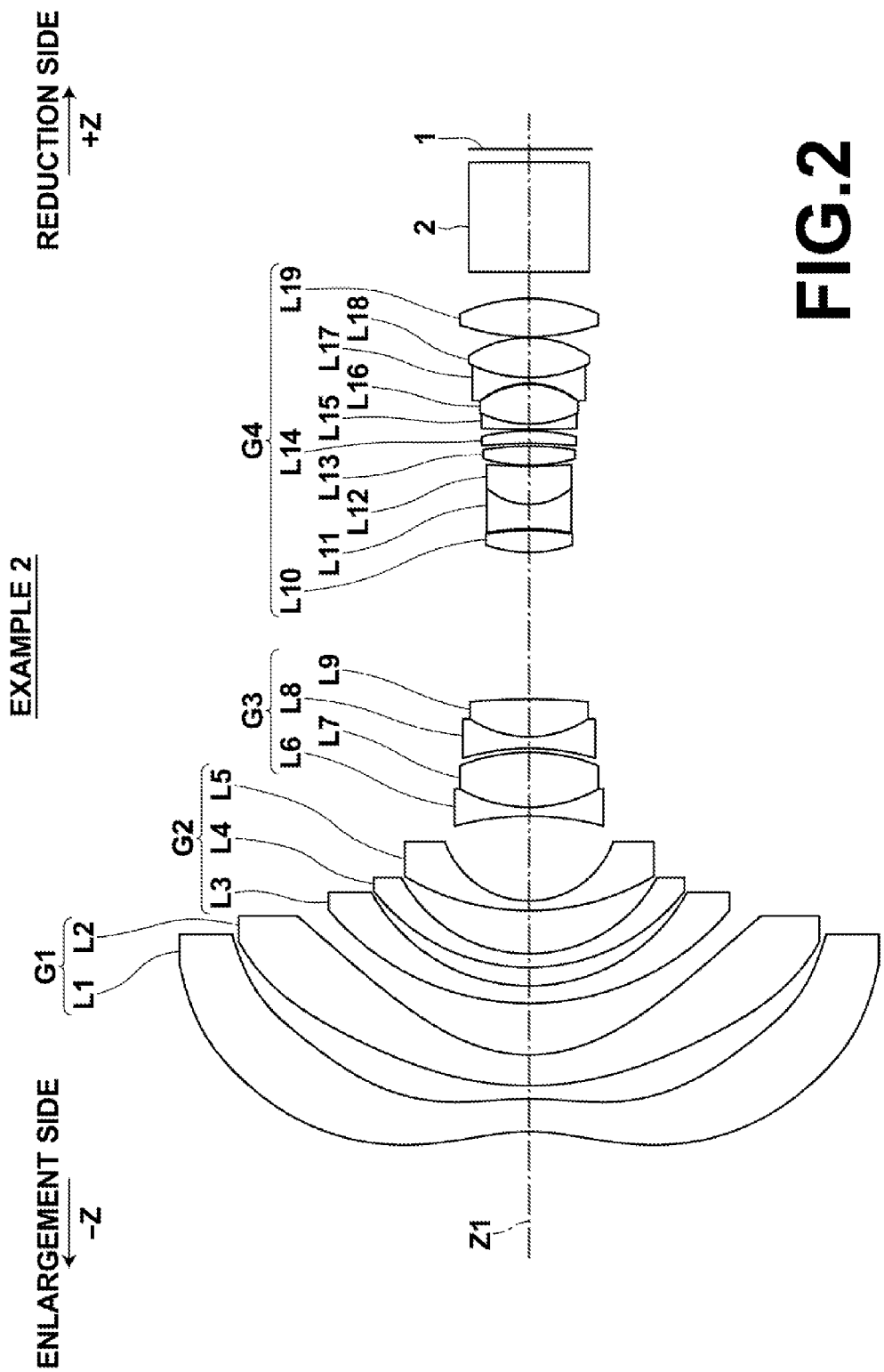
FIG. 2 is a sectional view illustrating the lens configuration of a wide-angle projection lens of Example 2 of the invention.

The configuration of the wide-angle projection lens of Example 2 is as shown in FIG. 2. The configuration of the wide-angle projection lens of Example 2 is substantially the same as that of the above-described wide-angle projection lens of Example 1, except that the lens L9 has a biconvex shape. Table 3 shows basic lens data of the wide-angle projection lens of Example 2 and intervals between the lens groups when the projection distance is changed, and Table 4 shows aspherical coefficients of each aspherical surface of the wide-angle projection lens of Example 2.

TABLE 3

| Example 2 | | | | |
|---|---|---|---|---|
| Si | Ri | Di | Ndj | νdj |
| *1 | −41.264 | 7.50 | 1.49100 | 57.6 |
| *2 | −69.736 | 3.00 | | |
| *3 | 73.115 | 7.00 | 1.49100 | 57.6 |
| *4 | 34.529 | (10.45) | | |
| 5 | 59.765 | 3.95 | 1.69680 | 55.5 |
| 6 | 40.979 | 4.19 | | |
| 7 | 44.730 | 3.10 | 1.61800 | 63.3 |
| 8 | 33.085 | 9.83 | | |
| 9 | 55.415 | 2.20 | 1.75500 | 52.3 |
| 10 | 20.342 | (21.59) | | |
| 11 | −64.997 | 2.00 | 1.84666 | 23.8 |
| 12 | 31.968 | 12.51 | 1.65412 | 39.7 |
| 13 | −42.139 | 0.90 | | |
| 14 | −51.297 | 2.63 | 1.77250 | 49.6 |
| 15 | 24.415 | 8.54 | 1.72047 | 34.7 |
| 16 | −150.340 | (32.45) | | |
| 17 | 29.369 | 4.96 | 1.80518 | 25.4 |
| 18 | −67.717 | 0.42 | | |
| 19 | −56.654 | 5.55 | 1.83481 | 42.7 |
| 20 | 14.272 | 8.66 | 1.63980 | 34.5 |
| 21 | 128.235 | 0.20 | | |
| 22 | 35.873 | 4.40 | 1.49700 | 81.5 |
| 23 | −65.433 | 0.65 | | |
| *24 | −106.225 | 2.83 | 1.51007 | 56.2 |
| *25 | −41.901 | 0.30 | | |
| 26 | 210.592 | 1.25 | 1.83481 | 42.7 |
| 27 | 25.694 | 9.02 | 1.49700 | 81.5 |
| 28 | −17.905 | 0.22 | | |
| 29 | −17.539 | 1.30 | 1.78470 | 26.3 |
| 30 | 30.957 | 9.13 | 1.49700 | 81.5 |
| 31 | −24.731 | 0.20 | | |
| 32 | 48.135 | 8.66 | 1.49700 | 81.5 |
| 33 | −37.107 | 9.13 | | |
| 34 | ∞ | 25.00 | 1.51680 | 64.2 |
| 35 | ∞ | 0.01 | | |

TABLE 3-continued

| Projection distance (mm) | 1250 | 630 | 460 |
|---|---|---|---|
| D4 | 11.13 | 11.76 | 12.22 |
| D10 | 20.41 | 19.31 | 18.49 |
| D16 | 32.95 | 33.43 | 33.78 |

TABLE 4

| Example 2 | | | | | | |
|---|---|---|---|---|---|---|
| | 1st surface | 2nd surFace | 3rd surface | 4th surface | 24th surface | 25th surface |
| K | −1.12300E−01 | −2.79783E+00 | 3.00000E−07 | −1.00000E−07 | 1.00000E+00 | 1.00000E+00 |
| A3 | 1.24412E−04 | 1.14615E−04 | 3.89535E−06 | 2.31257E−05 | 0.00000E+00 | 0.00000E+00 |
| A4 | 1.76125E−05 | 1.42164E−05 | 1.44260E−06 | −3.67789E−07 | −2.59351E−05 | −1.53198E−05 |
| A5 | −5.56156E−07 | −3.78187E−07 | −5.59102E−08 | −5.62087E−08 | 4.75776E−06 | 6.57670E−06 |
| A6 | 1.93159E−09 | 7.93242E−10 | −6.45747E−12 | 8.43480E−11 | −1.42727E−07 | −6.85448E−07 |
| A7 | 1.77319E−10 | 3.79980E−11 | 1.28849E−11 | 2.49458E−11 | −4.41534E−08 | 1.21106E−08 |
| A8 | −2.26862E−12 | 2.96299E−13 | −1.62272E−13 | −2.60314E−13 | 7.80095E−09 | 5.86530E−09 |
| A9 | −2.40907E−14 | 1.50641E−14 | −1.76382E−15 | −9.07705E−16 | −6.03164E−10 | −6.91668E−10 |
| A10 | 4.98685E−16 | −3.52810E−16 | 1.65202E−17 | 8.18845E−18 | 2.00483E−11 | 2.48171E−11 |
| A11 | 3.35432E−18 | −1.34079E−17 | −1.15212E−19 | 7.54850E−21 | | |
| A12 | −1.07011E−19 | 3.35974E−19 | 1.23748E−21 | 1.27102E−21 | | |
| A13 | 5.60403E−22 | −1.92106E−21 | | | | |

EXAMPLE 3

Figure 3:
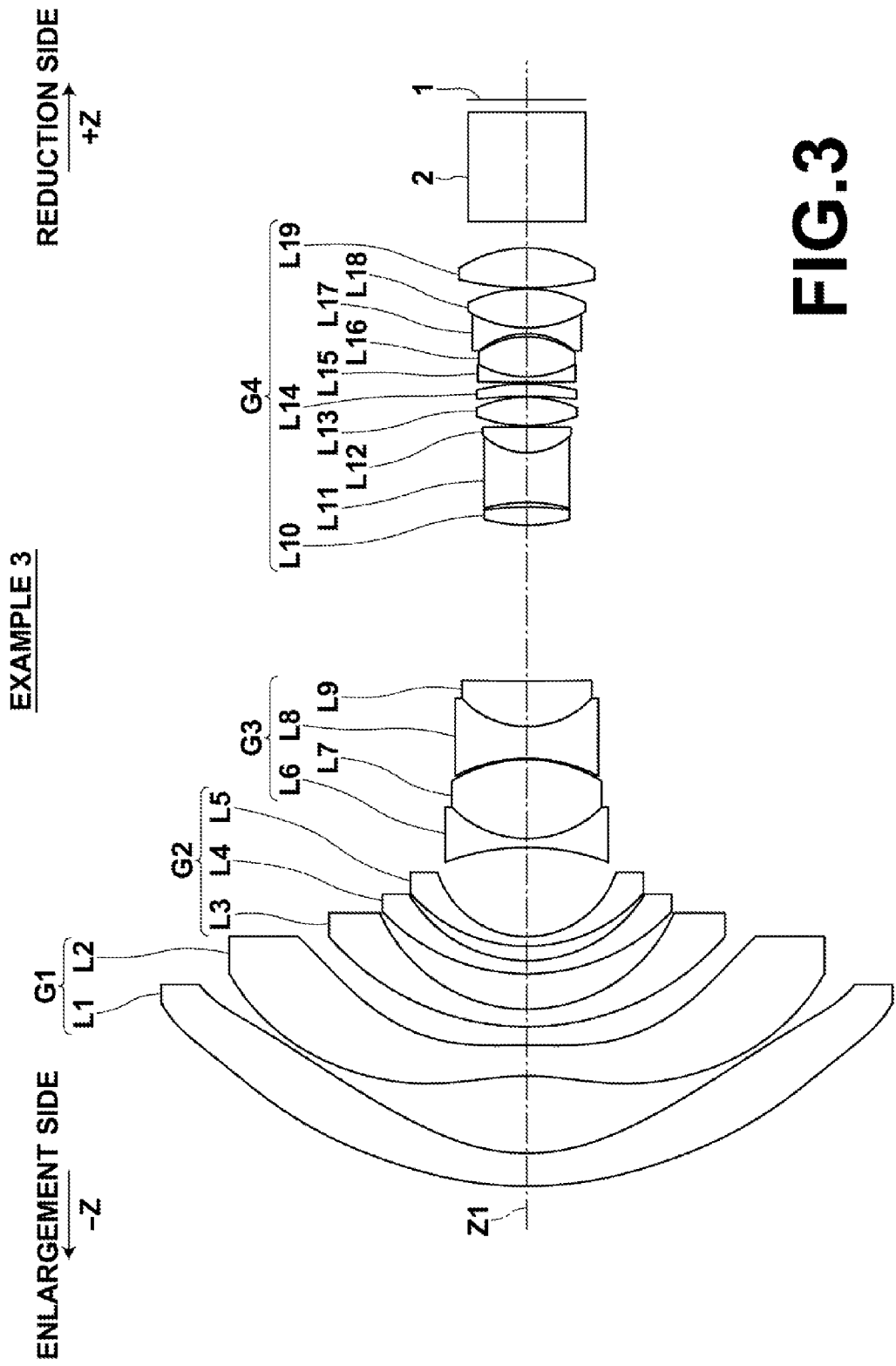
FIG. 3 is a sectional view illustrating the lens configuration of a wide-angle projection lens of Example 3 of the invention.

The configuration of the wide-angle projection lens of Example 3 is as shown in FIG. 3. The configuration of the wide-angle projection lens of Example 3 is substantially the same as that of the above-described wide-angle projection lens of Example 1, except that the lens L1 has a negative meniscus shape with the convex surface facing the enlargement side in the paraxial region, the lens L2 has a negative meniscus shape with the convex surface facing the reduction side in the paraxial region, and the lens L12 has a biconvex shape. Table 5 shows basic lens data of the wide-angle projection lens of Example 3 and intervals between the lens groups when the projection distance is changed, and Table 6 shows aspherical coefficients of each aspherical surface of the wide-angle projection lens of Example 3.

TABLE 5

| Example 3 | | | | |
|---|---|---|---|---|
| Si | Ri | Di | Ndj | νdj |
| *1 | 91.783 | 7.50 | 1.49100 | 57.6 |
| *2 | 45.590 | 17.70 | | |
| *3 | −49.523 | 7.00 | 1.49100 | 57.6 |
| *4 | −216.142 | (3.09) | | |
| 5 | 60.232 | 4.00 | 1.83481 | 42.7 |
| 6 | 36.774 | 8.09 | | |
| 7 | 45.740 | 3.00 | 1.61800 | 63.3 |
| 8 | 31.640 | 3.27 | | |
| 9 | 35.433 | 2.20 | 1.75500 | 52.3 |
| 10 | 21.577 | (22.36) | | |
| 11 | −53.248 | 2.00 | 1.84666 | 23.8 |
| 12 | 24.150 | 18.05 | 1.65412 | 39.7 |
| 13 | −32.271 | 0.20 | | |
| 14 | −35.592 | 7.28 | 1.61800 | 63.3 |
| 15 | 20.218 | 10.38 | 1.72047 | 34.7 |
| 16 | 582.470 | (34.77) | | |

TABLE 5-continued

Example 3

| | | | | |
|---|---|---|---|---|
| 17 | 36.322 | 4.13 | 1.84666 | 23.8 |
| 18 | −71.546 | 1.07 | | |
| 19 | −35.275 | 11.32 | 1.83481 | 42.7 |
| 20 | 14.678 | 5.94 | 1.65412 | 39.7 |
| 21 | −392.131 | 0.20 | | |
| 22 | 31.367 | 6.52 | 1.49700 | 81.5 |
| 23 | −28.387 | 0.20 | | |
| *24 | −98.824 | 2.89 | 1.51007 | 56.2 |
| *25 | −41.266 | 0.30 | | |
| 26 | 455.683 | 1.25 | 1.83481 | 42.7 |
| 27 | 22.708 | 9.18 | 1.49700 | 81.6 |
| 28 | −18.637 | 0.70 | | |
| 29 | −16.937 | 1.30 | 1.80000 | 29.8 |
| 30 | 26.166 | 8.90 | 1.49700 | 81.6 |
| 31 | −29.648 | 0.20 | | |
| 32 | 63.873 | 9.13 | 1.49700 | 81.6 |
| 33 | −28.006 | 9.09 | | |
| 34 | ∞ | 25.00 | 1.51680 | 64.2 |
| 35 | ∞ | 0.01 | | |

| Projection distance (mm) | 1250 | 630 | 470 |
|---|---|---|---|
| D4 | 3.72 | 4.20 | 4.62 |
| D10 | 21.26 | 20.37 | 19.63 |
| D16 | 35.25 | 35.65 | 35.98 |

TABLE 6

Example 3

| | 1st surface | 2nd surface | 3rd surface | 4th surface | 24th surface | 25th surface |
|---|---|---|---|---|---|---|
| K | −1.12300E−01 | −2.79783E+00 | 3.00000E−07 | −1.00000E−07 | 1.00000E+00 | 1.00000E+00 |
| A3 | 1.24412E−04 | 1.14615E−04 | 3.89535E−06 | 2.31257E−05 | 0.00000E+00 | 0.00000E+00 |
| A4 | 1.76125E−05 | 1.42164E−05 | 1.44260E−06 | −3.67789E−07 | −2.59351E−05 | −1.53198E−05 |
| A5 | −5.56156E−07 | −3.78187E−07 | −5.59102E−08 | −5.62087E−08 | 4.75776E−06 | 6.57670E−06 |
| A6 | 1.93159E−09 | 7.93242E−10 | −6.45747E−12 | 8.43480E−11 | −1.42727E−07 | −6.85448E−07 |
| A7 | 1.77319E−10 | 3.79980E−11 | 1.28849E−11 | 2.49458E−11 | −4.41534E−08 | 1.21106E−08 |
| A8 | −2.26862E−12 | 2.96299E−13 | −1.62272E−14 | −2.60314E−13 | 7.80095E−09 | 5.86530E−09 |
| A9 | −2.40907E−14 | 1.50641E−14 | −1.76382E−15 | −9.07705E−16 | −6.03164E−10 | −6.91668E−10 |
| A10 | 4.98685E−16 | −3.52810E−16 | 1.65202E−17 | 8.18845E−18 | 2.00483E−11 | 2.48171E−11 |
| A11 | 3.35432E−18 | −1.34079E−17 | −1.15212E−19 | 7.54850E−21 | | |
| A12 | −1.07011E−19 | 3.35974E−19 | 1.23748E−21 | 1.27102E−21 | | |
| A13 | 5.60403E−22 | −1.92106E−21 | | | | |

EXAMPLE 4

Figure 4:
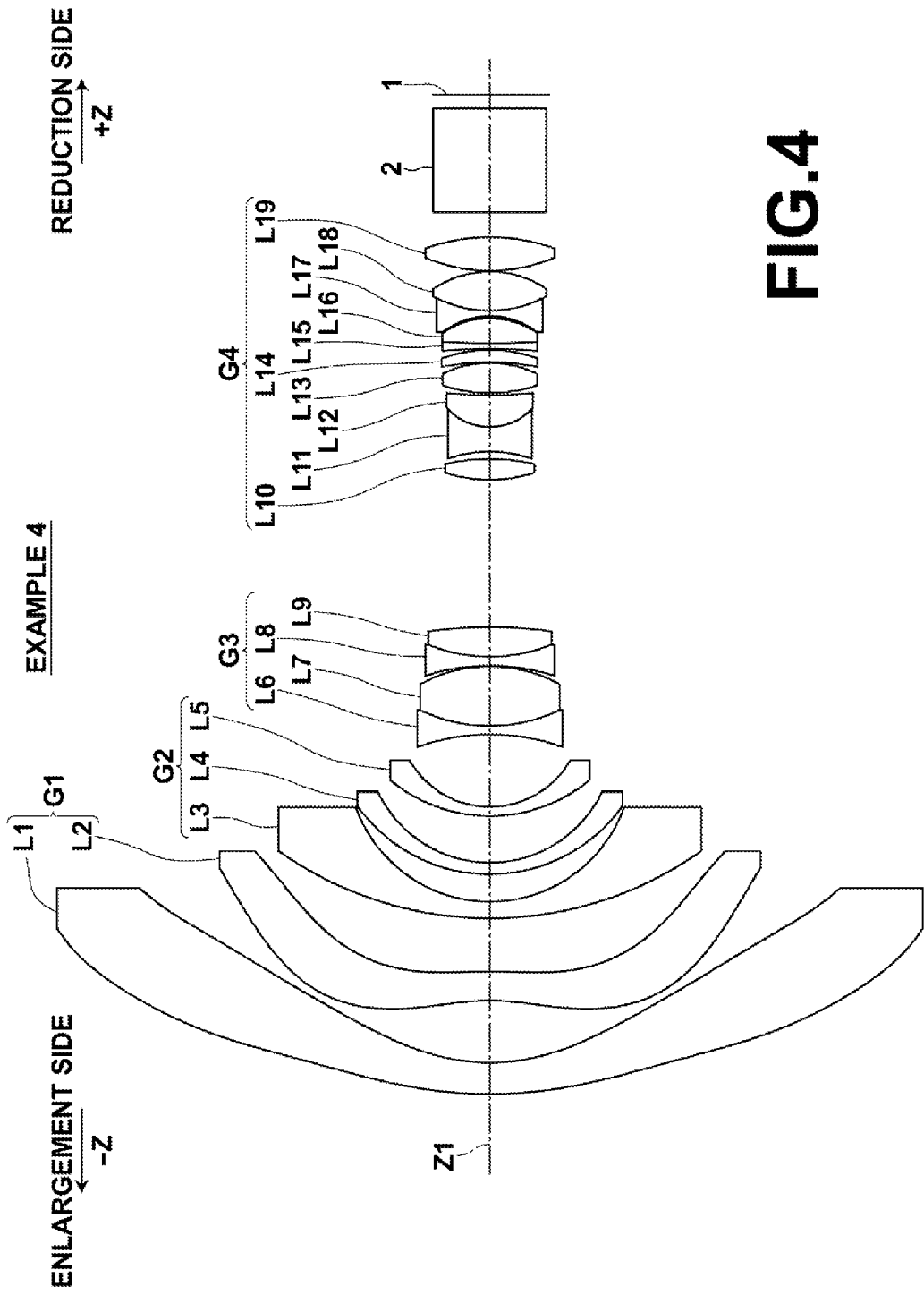
FIG. 4 is a sectional view illustrating the lens configuration of a wide-angle projection lens of Example 4 of the invention.

The configuration of the wide-angle projection lens of Example 4 is as shown in FIG. 4. The configuration of the wide-angle projection lens of Example 4 is substantially the same as that of the above-described wide-angle projection lens of Example 1, except that the lens L1 has a negative meniscus shape with the convex surface facing the enlargement side in the paraxial region, the lens L2 has a negative meniscus shape with the convex surface facing the reduction side in the paraxial region, the lens L9 has a biconvex shape, and the lens L15 has a biconcave shape. Table 7 shows basic lens data of the wide-angle projection lens of Example 4 and intervals between the lens groups when the projection distance is changed, and Table 8 shows aspherical coefficients of each aspherical surface of the wide-angle projection lens of Example 4.

TABLE 7

Example 4

| Si | Ri | Di | Ndj | vdj |
|---|---|---|---|---|
| *1 | 114.557 | 7.50 | 1.49100 | 57.6 |
| *2 | 47.886 | 15.05 | | |
| *3 | −46.927 | 7.00 | 1.49100 | 57.6 |
| *4 | −112.454 | (12.23) | | |
| 5 | 88.249 | 4.00 | 1.69680 | 55.5 |
| 6 | 34.418 | 6.61 | | |
| 7 | 39.361 | 2.80 | 1.61800 | 63.3 |
| 8 | 29.982 | 11.26 | | |
| 9 | 37.770 | 2.20 | 1.75500 | 52.3 |
| 10 | 22.407 | (18.65) | | |
| 11 | −51.711 | 2.00 | 1.84666 | 23.8 |
| 12 | 38.884 | 14.36 | 1.65412 | 39.7 |
| 13 | −35.240 | 0.20 | | |
| 14 | −50.269 | 2.13 | 1.83481 | 42.7 |
| 15 | 39.635 | 7.13 | 1.72047 | 34.7 |
| 16 | −112.066 | (34.98) | | |
| 17 | 34.160 | 5.04 | 1.84666 | 23.8 |
| 18 | −46.704 | 1.77 | | |
| 19 | −30.935 | 5.91 | 1.83481 | 42.7 |
| 20 | 14.026 | 7.72 | 1.66680 | 33.1 |
| 21 | 122.086 | 0.49 | | |
| 22 | 36.116 | 7.26 | 1.49700 | 81.5 |
| 23 | −25.927 | 0.20 | | |
| *24 | −55.364 | 2.94 | 1.51007 | 56.2 |
| *25 | −31.265 | 0.30 | | |
| 26 | −109.078 | 1.25 | 1.83481 | 42.7 |
| 27 | 163.130 | 6.08 | 1.49700 | 81.6 |
| 28 | −20.020 | 0.50 | | |
| 29 | −18.830 | 1.30 | 1.84666 | 23.8 |
| 30 | 28.693 | 9.42 | 1.49700 | 81.6 |
| 31 | −24.558 | 0.20 | | |
| 32 | 40.260 | 8.12 | 1.49700 | 81.6 |
| 33 | −46.128 | 9.07 | | |
| 34 | ∞ | 25.00 | 1.51680 | 64.2 |
| 35 | ∞ | 0.01 | | |

| Projection distance (mm) | 1250 | 630 | 470 |
|---|---|---|---|
| D4 | 12.10 | 12.80 | 13.38 |
| D10 | 18.74 | 17.50 | 16.50 |
| D16 | 35.02 | 35.56 | 35.99 |

TABLE 8

Example 4

| | 1st surface | 2nd surface | 3rd surface | 4th surface | 24th surface | 25th surface |
|---|---|---|---|---|---|---|
| K | 3.00000E-07 | -1.00000E-07 | -1.12300E-01 | -2.79783E+00 | 1.00000E+00 | 1.00000E+00 |
| A3 | 3.88943E-06 | 2.31311E-05 | 1.24445E-04 | 1.14602E-04 | 0.00000E+00 | 0.00000E+00 |
| A4 | 1.44222E-06 | -3.66830E-07 | 1.76457E-05 | 1.42019E-05 | -2.59351E-05 | -1.53198E-05 |
| A5 | -5.59118E-08 | -5.62058E-08 | -5.56008E-07 | -3.78269E-07 | 4.75772E-06 | 6.57667E-06 |
| A6 | -8.57244E-12 | 8.53004E-11 | 1.91865E-09 | 7.62680E-10 | -1.42727E-07 | -6.85448E-07 |
| A7 | 1.21340E-11 | 2.49916E-11 | 1.78113E-10 | 3.85115E-11 | -4.41534E-08 | 1.21106E-08 |
| A8 | -9.86973E-15 | -2.40403E-13 | -2.05611E-12 | 4.86587E-13 | 7.80095E-09 | 5.86530E-09 |
| A9 | -1.91602E-15 | -4.60607E-16 | -2.38017E-14 | 1.58513E-14 | -6.03164E-10 | -6.91668E-10 |
| A10 | 1.35071E-17 | 1.44844E-17 | 5.02735E-16 | -2.14407E-16 | 2.00483E-11 | 2.48171E-11 |
| A11 | 7.38799E-21 | -6.03208E-19 | 1.03906E-19 | -1.43075E-17 | | |
| A12 | -2.68017E-22 | 1.05866E-20 | -5.12993E-20 | 1.95474E-19 | | |
| A13 | 5.49089E-25 | -5.22480E-23 | 2.87985E-22 | -2.26069E-22 | | |

EXAMPLE 5

Figure 5:
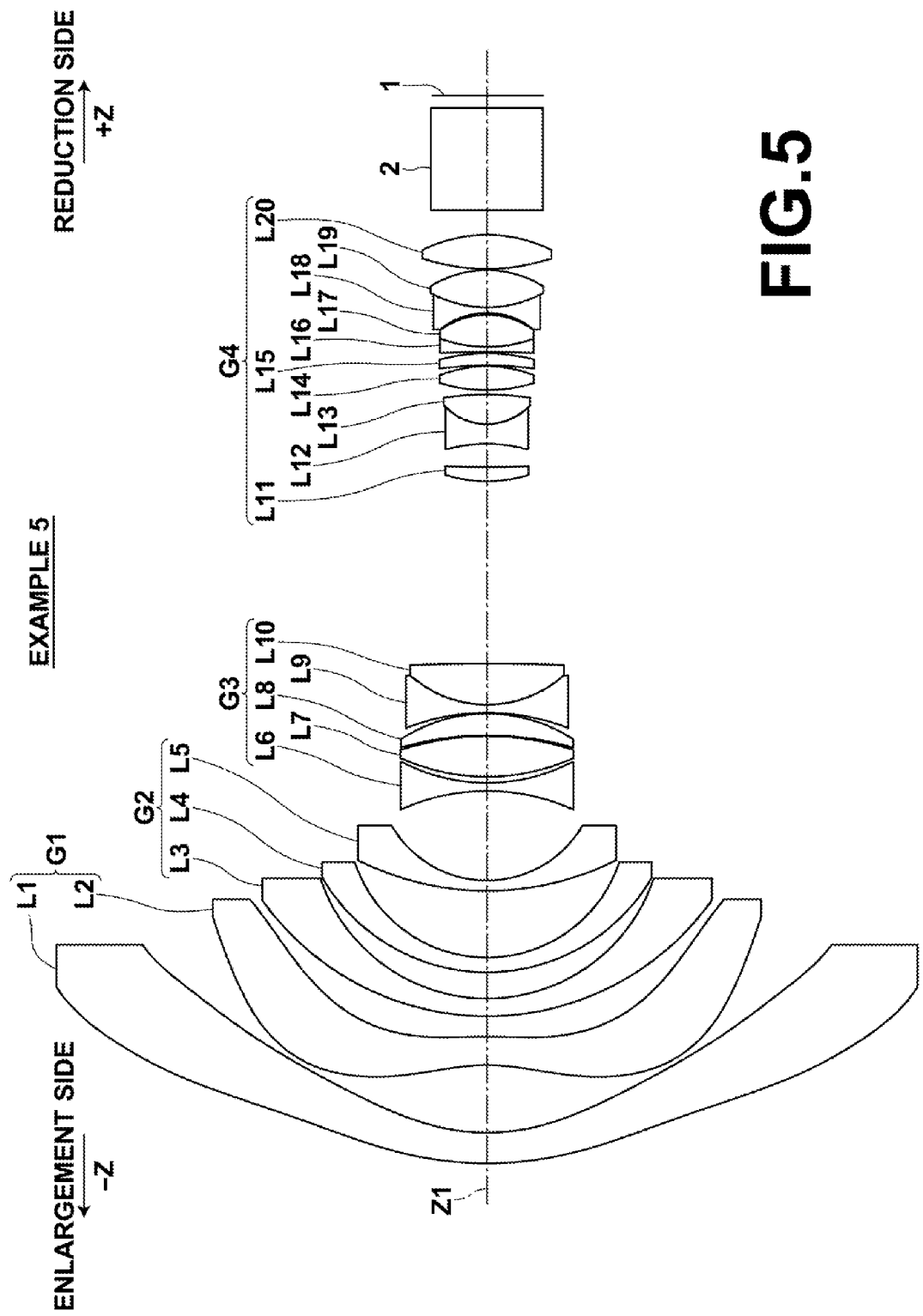
FIG. 5 is a sectional view illustrating the lens configuration of a wide-angle projection lens of Example 5 of the invention.

The configuration of the wide-angle projection lens of Example 5 is as shown in FIG. 5. The wide-angle projection lens of Example 5 includes, in order from the enlargement side, the first lens group G1 having a negative refractive power, the second lens group G2 having a negative refractive power, the third lens group G3 having a negative refractive power, and the fourth lens group G4 having a positive refractive power. The wide-angle projection lens is substantially telecentric at the reduction side. The glass block (including a filtering section) 2 mainly formed by a color combining prism and the image display surface 1 of the light valve are disposed on the reduction side of the wide-angle projection lens.

The first lens group G1 includes, in order from the enlargement side, a lens L1 having a negative meniscus shape with the convex surface facing the enlargement side in the paraxial region, and a lens L2 having a negative meniscus shape with the convex surface facing the reduction side in the paraxial region. Both surfaces of the lens L1 and both surfaces of the lens L2 are aspherical surfaces.

The second lens group G2 includes three lenses L3 to L5, each having a negative meniscus shape with the convex surface facing the enlargement side.

The third lens group G3 includes, in order from the enlargement side, a lens L6 having a biconcave shape, a lens L7 having a biconvex shape, a lens L8 having a positive meniscus shape with the convex surface facing the reduction side, and a cemented lens formed by a lens L9 having a biconcave shape and a lens L10 having a biconvex shape cemented together.

The fourth lens group G4 includes, in order from the enlargement side, a lens L11 having a positive meniscus shape with the convex surface facing the enlargement side, a cemented lens formed by a lens L12 having a biconcave shape and a lens L13 having a biconvex shape cemented together, a lens L14 having a biconvex shape, a lens L15 having a positive meniscus shape with the convex surface facing the reduction side in the paraxial region, a cemented lens formed by a lens L16 having a biconcave shape and a lens L17 having a biconvex shape cemented together, a cemented lens formed by a lens L18 having a biconcave shape and a lens L19 having a biconvex shape cemented together, and a lens L20 having a biconvex shape. Both surfaces of the lens L15 are aspherical surfaces.

Table 9 shows basic lens data of the wide-angle projection lens of Example 5 and intervals between the lens groups when the projection distance is changed, and Table 10 shows aspherical coefficients of each aspherical surface of the wide-angle projection lens of Example 5.

TABLE 9

Example 5

| Si | Ri | Di | Ndj | νdj |
|---|---|---|---|---|
| *1 | 88.528 | 7.50 | 1.49100 | 57.6 |
| *2 | 50.840 | 16.53 | | |
| *3 | -41.721 | 7.00 | 1.49100 | 57.6 |
| *4 | -125.390 | (4.16) | | |
| 5 | 67.538 | 4.30 | 1.67790 | 55.3 |
| 6 | 43.023 | 6.43 | | |
| 7 | 46.704 | 3.60 | 1.61800 | 63.3 |
| 8 | 34.142 | 16.31 | | |
| 9 | 70.359 | 2.50 | 1.83481 | 42.7 |
| 10 | 27.063 | (24.83) | | |
| 11 | -51.138 | 2.00 | 1.80518 | 25.4 |
| 12 | 45.453 | 1.47 | | |
| 13 | 51.741 | 9.91 | 1.65412 | 39.7 |
| 14 | -68.248 | 0.20 | | |
| 15 | -76.598 | 5.30 | 1.51823 | 58.9 |
| 16 | -38.629 | 0.20 | | |
| 17 | -54.804 | 2.02 | 1.61800 | 63.3 |
| 18 | 28.359 | 10.02 | 1.72047 | 34.7 |
| 19 | -456.350 | (42.47) | | |
| 20 | 33.839 | 3.50 | 1.84666 | 23.8 |
| 21 | 255.595 | 5.66 | | |
| 22 | -37.018 | 4.84 | 1.83481 | 42.7 |
| 23 | 14.464 | 7.21 | 1.72047 | 34.7 |
| 24 | -72.821 | 1.12 | | |
| 25 | 39.817 | 5.80 | 1.49700 | 81.5 |
| 26 | -31.287 | 0.20 | | |
| *27 | -83.983 | 3.00 | 1.51007 | 56.2 |
| *28 | -40.179 | 0.30 | | |
| 29 | -253.965 | 1.25 | 1.83481 | 42.7 |
| 30 | 34.348 | 7.93 | 1.49700 | 81.6 |
| 31 | -19.112 | 0.49 | | |
| 32 | -17.857 | 1.30 | 1.80000 | 29.8 |
| 33 | 28.668 | 9.12 | 1.49700 | 81.6 |
| 34 | -25.949 | 0.30 | | |
| 35 | 50.490 | 8.32 | 1.49700 | 81.6 |
| 36 | -35.349 | 9.08 | | |
| 37 | ∞ | 25.00 | 1.51680 | 64.2 |
| 38 | ∞ | 0.01 | | |

| Projection distance (mm) | 1250 | 630 | 470 |
|---|---|---|---|
| D4 | 4.61 | 4.99 | 5.24 |
| D10 | 23.29 | 21.91 | 20.99 |
| D19 | 43.57 | 44.56 | 45.23 |

TABLE 10

Example 5

| | 1st surface | 2nd surface | 3rd surface | 4th surface | 27th surface | 28th surface |
|---|---|---|---|---|---|---|
| K | 3.00000E−07 | −1.00000E−07 | −1.12300E−01 | −2.79783E+00 | 1.00000E+00 | 1.00000E+00 |
| A3 | 3.87355E−06 | 2.31441E−05 | 1.24437E−04 | 1.14617E−04 | 0.00000E+00 | 0.00000E+00 |
| A4 | 1.43519E−06 | −3.62564E−07 | 1.76442E−05 | 1.42065E−05 | −2.59353E−05 | −1.53194E−05 |
| A5 | −5.59414E−08 | −5.61928E−08 | −5.56015E−07 | −3.78251E−07 | 4.75773E−06 | 6.57676E−06 |
| A6 | −6.89702E−12 | 8.73447E−11 | 1.91369E−09 | 7.70688E−10 | −1.42727E−07 | −6.85448E−07 |
| A7 | 1.21977E−11 | 2.57814E−11 | 1.77958E−10 | 3.83148E−11 | −4.41534E−08 | 1.21107E−08 |
| A8 | −2.17546E−14 | −2.56750E−13 | −2.12984E−12 | 4.81448E−13 | 7.80095E−09 | 5.86530E−09 |
| A9 | −2.61855E−15 | −3.41042E−16 | −2.40791E−14 | 1.56081E−14 | −6.03164E−10 | −6.91668E−10 |
| A10 | 3.80756E−17 | 5.65178E−18 | 4.31372E−16 | −2.31258E−16 | 2.00483E−11 | 2.48171E−11 |
| A11 | −2.43330E−19 | −1.44695E−20 | 2.43519E−18 | −1.47870E−17 | | |
| A12 | 6.41274E−22 | 4.36469E−22 | −5.30461E−20 | 2.54343E−19 | | |
| A13 | | | 1.14444E−22 | −9.58073E−22 | | |

EXAMPLE 6

Figure 6:
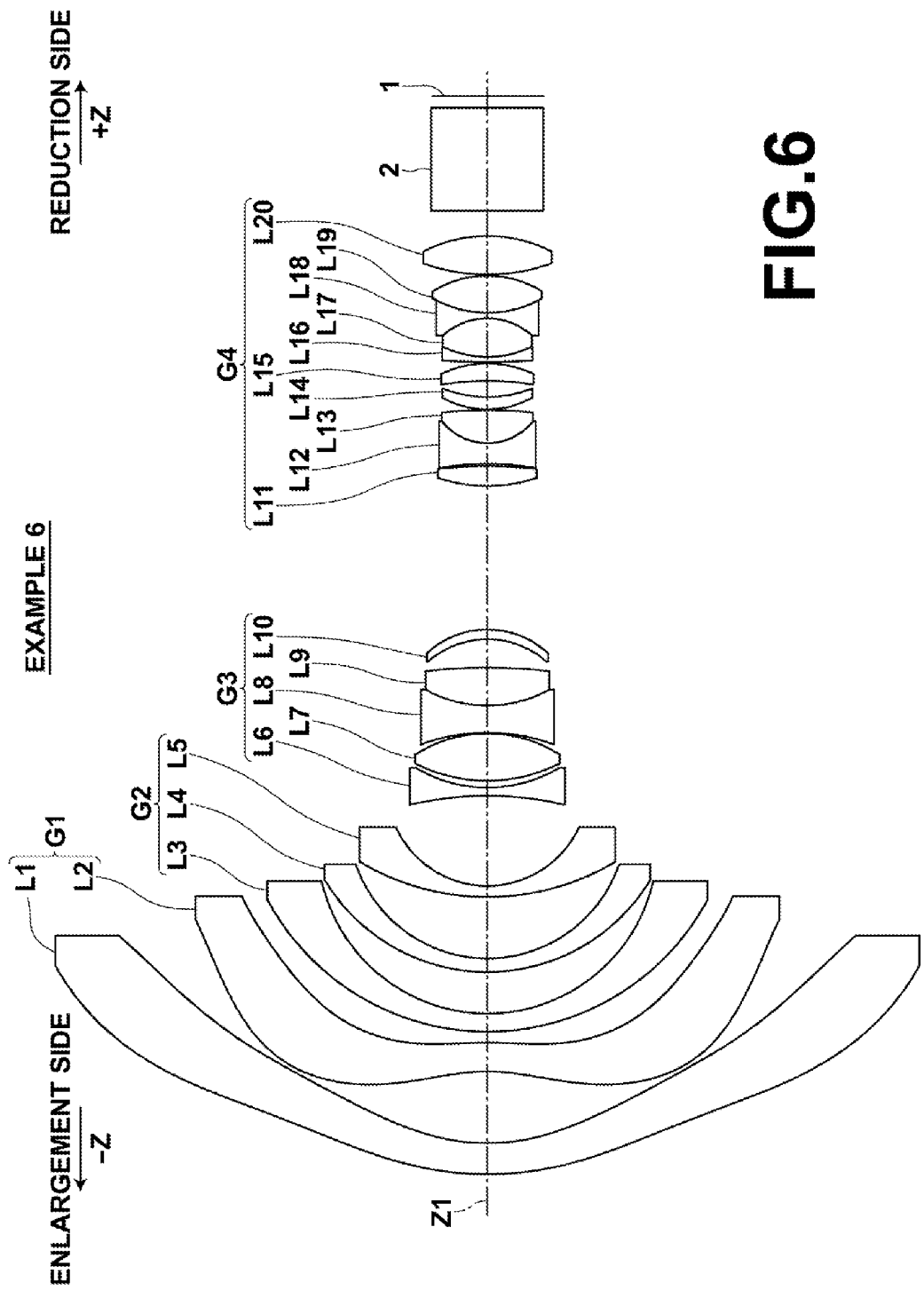
FIG. 6 is a sectional view illustrating the lens configuration of a wide-angle projection lens of Example 6 of the invention.

The configuration of the wide-angle projection lens of Example 6 is as shown in FIG. 6. The configuration of the wide-angle projection lens of Example 6 is substantially the same as that of the above-described wide-angle projection lens of Example 5, except that a lens L8 having a biconcave shape and a lens L9 having a biconvex shape are cemented together, the lens L10 is a single lens having a positive meniscus shape with the convex surface facing the reduction side, and the configuration of the fourth lens group G4 is different. The fourth lens group G4 of Example 6 includes, in order from the enlargement side, a lens L11 having a biconvex shape, a lens L12 having a biconcave shape, a lens L13 having a biconvex shape, a lens L14 having a positive meniscus shape with the convex surface facing the enlargement side, a lens L15 having a positive meniscus shape with the convex surface facing the reduction side in the paraxial region, a lens L16 having a negative meniscus shape with the convex surface facing the enlargement side, a lens L17 having a biconvex shape, a lens L18 having a biconcave shape, a lens L19 having a biconvex shape, and a lens L20 having a biconvex shape. The lens L12 and the lens L13 are cemented together. The lenses L16 to L19 are cemented together. Both surfaces of the lens L15 are aspherical surfaces.

Table 11 shows basic lens data of the wide-angle projection lens of Example 6 and intervals between the lens groups when the projection distance is changed, and Table 12 shows aspherical coefficients of each aspherical surface of the wide-angle projection lens of Example 6.

TABLE 11

Example 6

| Si | Ri | Di | Ndj | vdj |
|---|---|---|---|---|
| *1 | 80.461 | 7.50 | 1.49100 | 57.6 |
| *2 | 50.001 | 17.39 | | |
| *3 | −40.305 | 7.00 | 1.49100 | 57.6 |
| *4 | −98.676 | (3.00) | | |
| 5 | 60.566 | 4.40 | 1.71300 | 53.9 |
| 6 | 41.248 | 10.05 | | |
| 7 | 46.129 | 3.30 | 1.75500 | 52.3 |
| 8 | 33.801 | 14.83 | | |
| 9 | 60.689 | 2.70 | 1.67790 | 55.3 |
| 10 | 24.516 | (21.53) | | |
| 11 | −81.926 | 2.00 | 1.84666 | 23.8 |
| 12 | 34.255 | 1.65 | | |
| 13 | 38.945 | 11.42 | 1.51742 | 52.4 |
| 14 | −32.595 | 0.20 | | |
| 15 | −46.496 | 6.55 | 1.77250 | 49.6 |
| 16 | 31.230 | 9.17 | 1.65412 | 39.7 |
| 17 | −125.705 | 6.89 | | |
| 18 | −21.748 | 2.34 | 1.51742 | 52.4 |
| 19 | −21.694 | (34.69) | | |
| 20 | 37.356 | 4.81 | 1.84666 | 23.8 |
| 21 | −100.955 | 0.58 | | |
| 22 | −63.701 | 4.95 | 1.83481 | 42.7 |
| 23 | 14.168 | 7.98 | 1.72047 | 34.7 |
| 24 | −111.086 | 0.20 | | |
| 25 | 22.311 | 3.00 | 1.49700 | 81.5 |
| 26 | 29.235 | 3.92 | | |
| *27 | −64.625 | 4.21 | 1.51007 | 56.2 |
| *28 | −24.727 | 0.30 | | |
| 29 | 140.868 | 1.25 | 1.83481 | 42.7 |
| 30 | 24.818 | 9.35 | 1.49700 | 81.6 |
| 31 | −16.112 | 1.30 | 1.84666 | 23.8 |
| 32 | 26.544 | 9.00 | 1.49700 | 81.6 |
| 33 | −25.151 | 0.30 | | |
| 34 | 46.459 | 9.34 | 1.49700 | 81.6 |
| 35 | −33.839 | 9.10 | | |
| 36 | ∞ | 25.00 | 1.51680 | 64.2 |
| 37 | ∞ | 0.01 | | |

| Projection distance (mm) | 1250 | 630 | 470 |
|---|---|---|---|
| D4 | 1.69 | 2.64 | 3.17 |
| D10 | 23.25 | 21.81 | 20.98 |
| D19 | 34.28 | 34.78 | 35.07 |

TABLE 12

Example 6

| | 1st surface | 2nd surface | 3rd surface | 4th surface | 27th surface | 28th surface |
|---|---|---|---|---|---|---|
| K | 3.00000E−07 | −1.00000E−07 | −1.12300E−01 | −2.79783E+00 | 1.00000E+00 | 1.00000E+00 |
| A3 | 3.88397E−06 | 2.31326E−05 | 1.24447E−04 | 1.14603E−04 | 0.00000E+00 | 0.00000E+00 |
| A4 | 1.43599E−06 | −3.65780E−07 | 1.76477E−05 | 1.42009E−05 | −2.59350E−05 | −1.53199E−05 |
| A5 | −5.59548E−08 | −5.61996E−08 | −5.56000E−07 | −3.78276E−07 | 4.75794E−06 | 6.57650E−06 |
| A6 | −9.49153E−12 | 8.57821E−11 | 1.91966E−09 | 7.58079E−10 | −1.42727E−07 | −6.85448E−07 |
| A7 | 1.15930E−11 | 2.50034E−11 | 1.77906E−10 | 3.80938E−11 | −4.41533E−08 | 1.21106E−08 |
| A8 | −2.08866E−14 | −2.59803E−13 | −2.14074E−12 | 4.35260E−13 | 7.80095E−09 | 5.86530E−09 |

TABLE 12-continued

Example 6

| | 1st surface | 2nd surface | 3rd surface | 4th surface | 27th surface | 28th surface |
|---|---|---|---|---|---|---|
| A9  | −2.09854E−15 | −4.68259E−16 | −2.40664E−14 | 1.55822E−14 | −6.03164E−10 | −6.91668E−10 |
| A10 | 2.67932E−17 | 1.20053E−17 | 4.46864E−16 | −2.30908E−16 | 2.00483E−11 | 2.48171E−11 |
| A11 | −1.46776E−19 | 4.16778E−21 | 1.50530E−18 | −1.35461E−17 | | |
| A12 | 3.39220E−22 | −2.28509E−22 | −3.81483E−20 | 2.17859E−19 | | |
| A13 | | | 4.33450E−23 | −6.01119E−22 | | |

EXAMPLE 7

Figure 7:
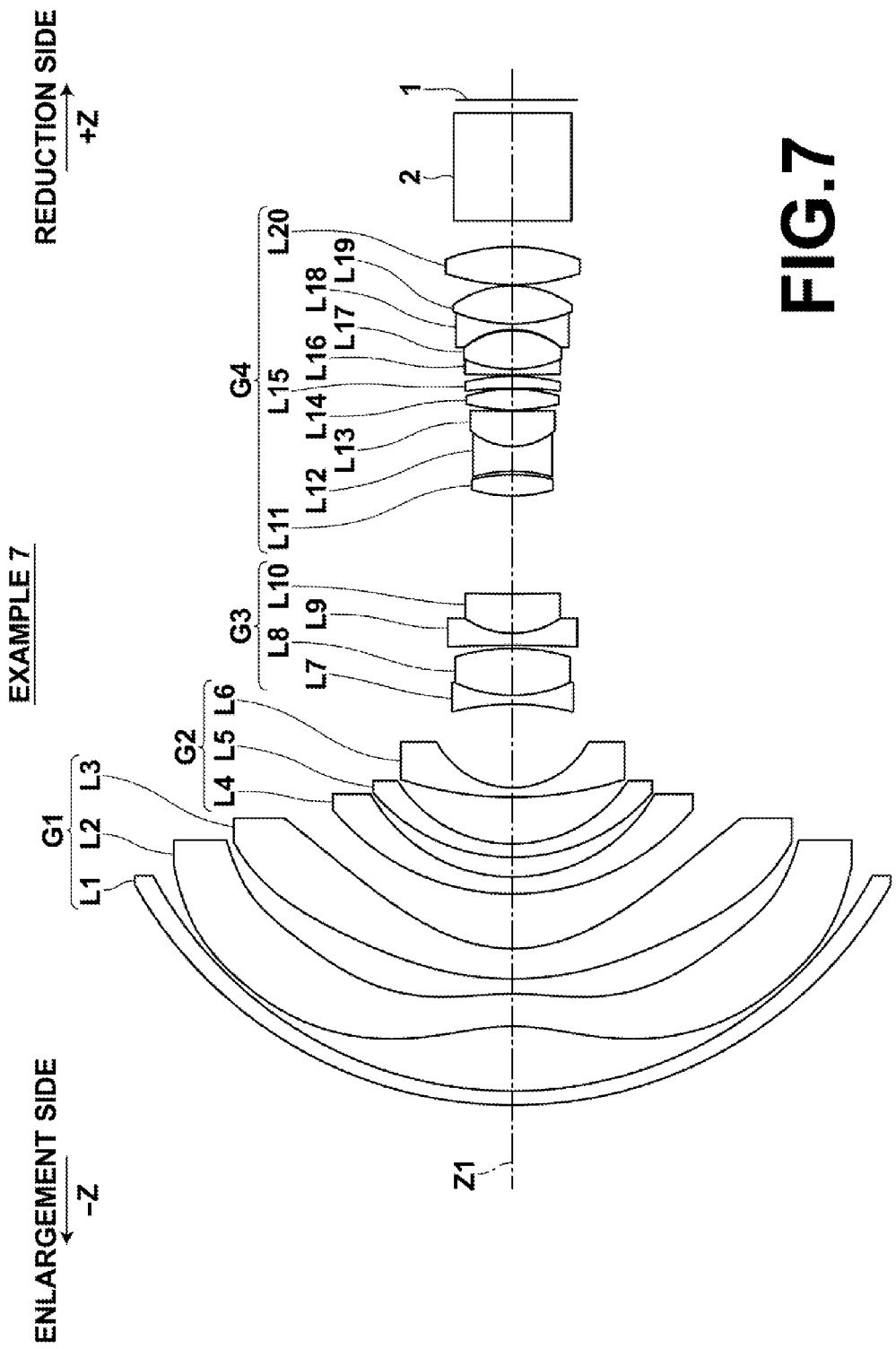
FIG. 7 is a sectional view illustrating the lens configuration of a wide-angle projection lens of Example 7 of the invention.

The configuration of the wide-angle projection lens of Example 7 is as shown in FIG. 7. The wide-angle projection lens of Example 7 includes, in order from the enlargement side, the first lens group G1 having a negative refractive power, the second lens group G2 having a negative refractive power, the third lens group G3 having a negative refractive power, and the fourth lens group G4 having a positive refractive power. The wide-angle projection lens is substantially telecentric at the reduction side. The glass block (including a filtering section) 2 mainly formed by a color combining prism and the image display surface 1 of the light valve are disposed on the reduction side of the wide-angle projection lens.

The first lens group G1 includes, in order from the enlargement side, a lens L1 having a negative meniscus shape with the convex surface facing the enlargement side, a lens L2 having a negative meniscus shape with the convex surface facing the reduction side in the paraxial region, and a lens L3 having a negative meniscus shape with the convex surface facing the enlargement side in the paraxial region. Both surfaces of the lens L2 and both surfaces of the lens L3 are aspherical surfaces.

The second lens group G2 includes three lenses L4 to L6, each having a negative meniscus shape with the convex surface facing the enlargement side.

The third lens group G3 includes, in order from the enlargement side, a cemented lens formed by a lens L7 having a biconcave shape and a lens L8 having a biconvex shape cemented together, and a cemented lens formed by a lens L9 having a biconcave shape and a lens L10 having a positive meniscus shape with the convex surface facing the enlargement side cemented together.

The fourth lens group G4 includes, in order from the enlargement side, a lens L11 having a biconvex shape, a cemented lens formed by a lens L12 having a biconcave shape and a lens L13 having a positive meniscus shape with the convex surface facing the enlargement side cemented together, a lens L14 having a biconvex shape, a lens L15 having a positive meniscus shape with the convex surface facing the reduction side in the paraxial region, a cemented lens formed by a lens L16 having a negative meniscus shape with the convex surface facing the enlargement side and a lens L17 having a biconvex shape cemented together, a cemented lens formed by a lens L18 having a biconcave shape and a lens L19 having a biconvex shape cemented together, and a lens L20 having a biconvex shape. Both surfaces of the lens L15 are aspherical surfaces.

Table 13 shows basic lens data of the wide-angle projection lens of Example 7 and intervals between the lens groups when the projection distance is changed, and Table 14 shows aspherical coefficients of each aspherical surface of the wide-angle projection lens of Example 7.

TABLE 13

Example 7

| Si | Ri | Di | Ndj | νdj |
|---|---|---|---|---|
| 1 | 100.563 | 3.3 | 1.51680 | 64.2 |
| 2 | 94.596 | 15.00 | | |
| *3 | −41.693 | 7.50 | 1.49100 | 57.6 |
| *4 | −71.146 | 3.47 | | |
| *5 | 73.181 | 7.00 | 1.49100 | 57.6 |
| *6 | 35.851 | (11.39) | | |
| 7 | 54.410 | 3.95 | 1.69680 | 55.5 |
| 8 | 37.876 | 4.55 | | |
| 9 | 42.518 | 3.10 | 1.61800 | 63.3 |
| 10 | 31.752 | 10.80 | | |
| 11 | 83.651 | 2.20 | 1.75500 | 52.3 |
| 12 | 19.940 | (21.61) | | |
| 13 | −53.837 | 2.00 | 1.84666 | 23.8 |
| 14 | 31.098 | 10.90 | 1.65412 | 39.7 |
| 15 | −45.002 | 0.82 | | |
| 16 | −244.639 | 2.68 | 1.77250 | 49.6 |
| 17 | 19.162 | 9.16 | 1.72047 | 34.7 |
| 18 | 445.461 | (21.64) | | |
| 19 | 31.372 | 4.94 | 1.80518 | 25.4 |
| 20 | −40.452 | 0.78 | | |
| 21 | −33.605 | 5.76 | 1.83481 | 42.7 |
| 22 | 14.878 | 8.21 | 1.63980 | 34.5 |
| 23 | 840.103 | 0.20 | | |
| 24 | 42.184 | 4.86 | 1.49700 | 81.5 |
| 25 | −37.570 | 0.21 | | |
| *26 | −91.057 | 2.82 | 1.51007 | 56.2 |
| *27 | −39.747 | 0.30 | | |
| 28 | 1079.850 | 1.25 | 1.83481 | 42.7 |
| 29 | 27.970 | 8.96 | 1.49700 | 81.5 |
| 30 | −17.799 | 0.25 | | |
| 31 | −17.323 | 1.30 | 1.78470 | 26.3 |
| 32 | 34.898 | 8.84 | 1.49700 | 81.5 |
| 33 | −23.423 | 0.20 | | |
| 34 | 47.278 | 8.78 | 1.49700 | 81.5 |
| 35 | −42.419 | 9.10 | | |
| 36 | ∞ | 25.00 | 1.51680 | 64.2 |
| 37 | ∞ | 0.01 | | |
| Projection distance (mm) | 1250 | 630 | 460 | |
| D6 | 12.00 | 12.63 | 13.09 | |
| D12 | 20.51 | 19.36 | 18.52 | |
| D18 | 22.13 | 22.65 | 23.03 | |

TABLE 14

Example 7

| | 3rd surface | 4th surface | 5th surface | 6th surface | 26th surface | 27th surface |
|---|---|---|---|---|---|---|
| K  | −1.12300E−01 | −2.79783E+00 | 3.00000E−07 | −1.00000E−07 | 1.00000E+00 | 1.00000E+00 |
| A3 | 1.24412E−04 | 1.14615E−04 | 3.89528E−06 | 2.31257E−05 | 0.00000E+00 | 0.00000E+00 |

TABLE 14-continued

Example 7

|  | 3rd surface | 4th surface | 5th surface | 6th surface | 26th surface | 27th surface |
|---|---|---|---|---|---|---|
| A4  | 1.76125E−05  | 1.42164E−05  | 1.44254E−06  | −3.67774E−07 | −2.59351E−05 | −1.53198E−05 |
| A5  | −5.56155E−07 | −3.78187E−07 | −5.59105E−08 | −5.62087E−08 | 4.75776E−06  | 6.57670E−06  |
| A6  | 1.93164E−09  | 7.93264E−10  | −6.61990E−12 | 8.43466E−11  | −1.42727E−07 | −6.85448E−07 |
| A7  | 1.77319E−10  | 3.80144E−11  | 1.28145E−11  | 2.49355E−11  | −4.41533E−08 | 1.21106E−08  |
| A8  | −2.27424E−12 | 3.03945E−13  | −1.64594E−14 | −2.60388E−13 | 7.80095E−09  | 5.86530E−09  |
| A9  | −2.41112E−14 | 1.50892E−14  | −1.77938E−15 | −9.35956E−16 | −6.03164E−10 | −6.91668E−10 |
| A10 | 4.96752E−16  | −3.48552E−16 | 1.71530E−17  | 8.21559E−18  | 2.00483E−11  | 2.48171E−11  |
| A11 | 3.74253E−18  | −1.37753E−17 | −1.06587E−19 | 9.16431E−21  |              |              |
| A12 | −1.15547E−19 | 3.39433E−19  | 1.32097E−21  | 1.29237E−21  |              |              |
| A13 | 6.13134E−22  | −1.90794E−21 |              |              |              |              |

Table 15 shows specifications and values relating to and values corresponding to the conditional expressions (1) to (6) of the above-described Examples 1 to 7. The "Fno" in Table 15 means f-number, and the total length is a distance from the most enlargement-side lens surface to the image plane at the reduction side along the optical axis (where the distance corresponding to the back focus is an equivalent air distance) when the projection distance is infinity. The values shown in Table 15 are with respect to the e-line.

TABLE 15

|  | Example 1 | Example 2 | Example 3 | Example 4 | Example 5 | Example 6 | Example 7 |
|---|---|---|---|---|---|---|---|
| f | 4.58 | 4.73 | 4.79 | 4.39 | 4.36 | 4.43 | 4.85 |
| Bf | 25.61 | 25.60 | 25.56 | 25.54 | 25.55 | 25.57 | 25.57 |
| Fno | 1.9 | 2.0 | 2.0 | 1.9 | 1.8 | 1.8 | 1.9 |
| Total length | 195.78 | 189.60 | 214.13 | 206.61 | 227.01 | 227.12 | 198.74 |
| Half angle of view | 67.06 | 66.66 | 66.04 | 67.69 | 67.86 | 66.99 | 66.24 |
| f1 | −70.90 | −70.90 | −76.05 | −83.74 | −85.27 | −95.25 | −83.02 |
| f2 | −31.48 | −29.05 | −34.97 | −29.51 | −31.47 | −33.72 | −24.46 |
| f3 | −82.98 | −66.29 | −65.70 | −70.01 | −131.16 | −57.49 | −70.54 |
| f123 | −10.82 | −9.91 | −11.36 | −10.01 | −13.74 | −10.62 | −8.96 |
| f4 | 36.19 | 37.25 | 38.74 | 37.10 | 37.36 | 41.32 | 35.28 |
| $d_{3-4}$ | 32.60 | 32.45 | 34.77 | 34.98 | 42.47 | 34.69 | 21.64 |
| (1) f123/f | −2.36 | −2.10 | −2.37 | −2.28 | −3.15 | −2.40 | −1.85 |
| (2) f4/f | 7.90 | 7.88 | 8.09 | 8.46 | 8.57 | 9.33 | 7.27 |
| (3) Bf/f | 5.59 | 5.41 | 5.34 | 5.82 | 5.86 | 5.77 | 5.27 |
| (4) f2/f123 | 2.91 | 2.93 | 3.08 | 2.95 | 2.29 | 3.17 | 2.73 |
| (5) f3/f123 | 7.67 | 6.69 | 5.78 | 6.99 | 9.54 | 5.41 | 7.87 |
| (6) $d_{3-4}$/f | 7.11 | 6.86 | 7.26 | 7.97 | 9.74 | 7.83 | 4.46 |

Figure 8:
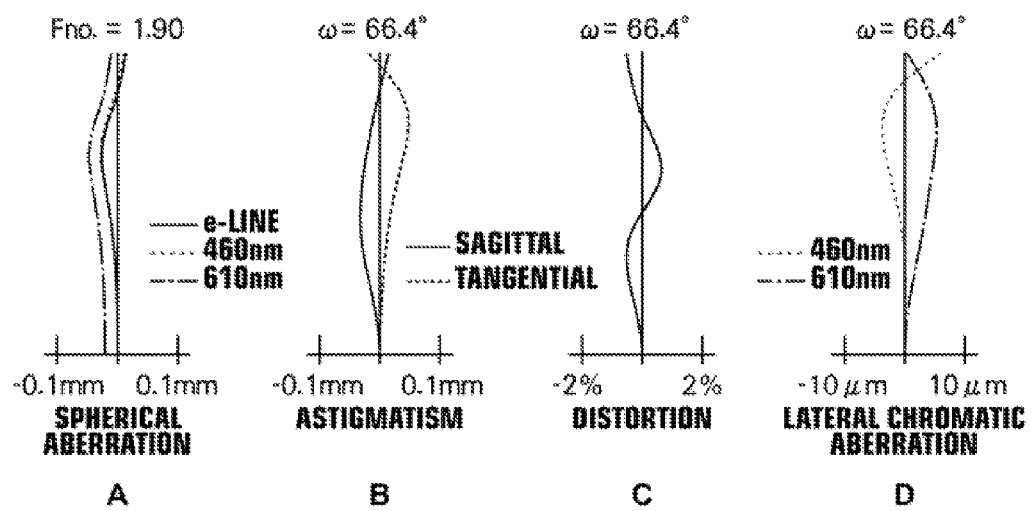
FIG. 8 shows, at A to D, aberration diagrams of the wide-angle projection lens of Example 1 of the invention.

FIG. 8 shows, at A to D, aberration diagrams of spherical aberration, astigmatism, distortion, and lateral chromatic aberration (magnification chromatic aberration) of the wide-angle projection lens of Example 1. The aberration diagrams are with respect to the e-line (wavelength 546 nm). The spherical aberration diagram also shows aberrations with respect to the wavelength of 460 nm and the wavelength of 610 nm. In the astigmatism diagram, an aberration in the sagittal direction is shown in the solid line and an aberration in the tangential direction is shown in the dashed line. The lateral chromatic aberration diagram shows aberrations with respect to the wavelength of 460 nm and the wavelength of 610 nm. The "Fno." shown above the vertical axis at A in FIG. 8 means the f-number. The symbol "ω" shown above the vertical axes at B to D in FIG. 8 means the half angle of view.

Figure 9:
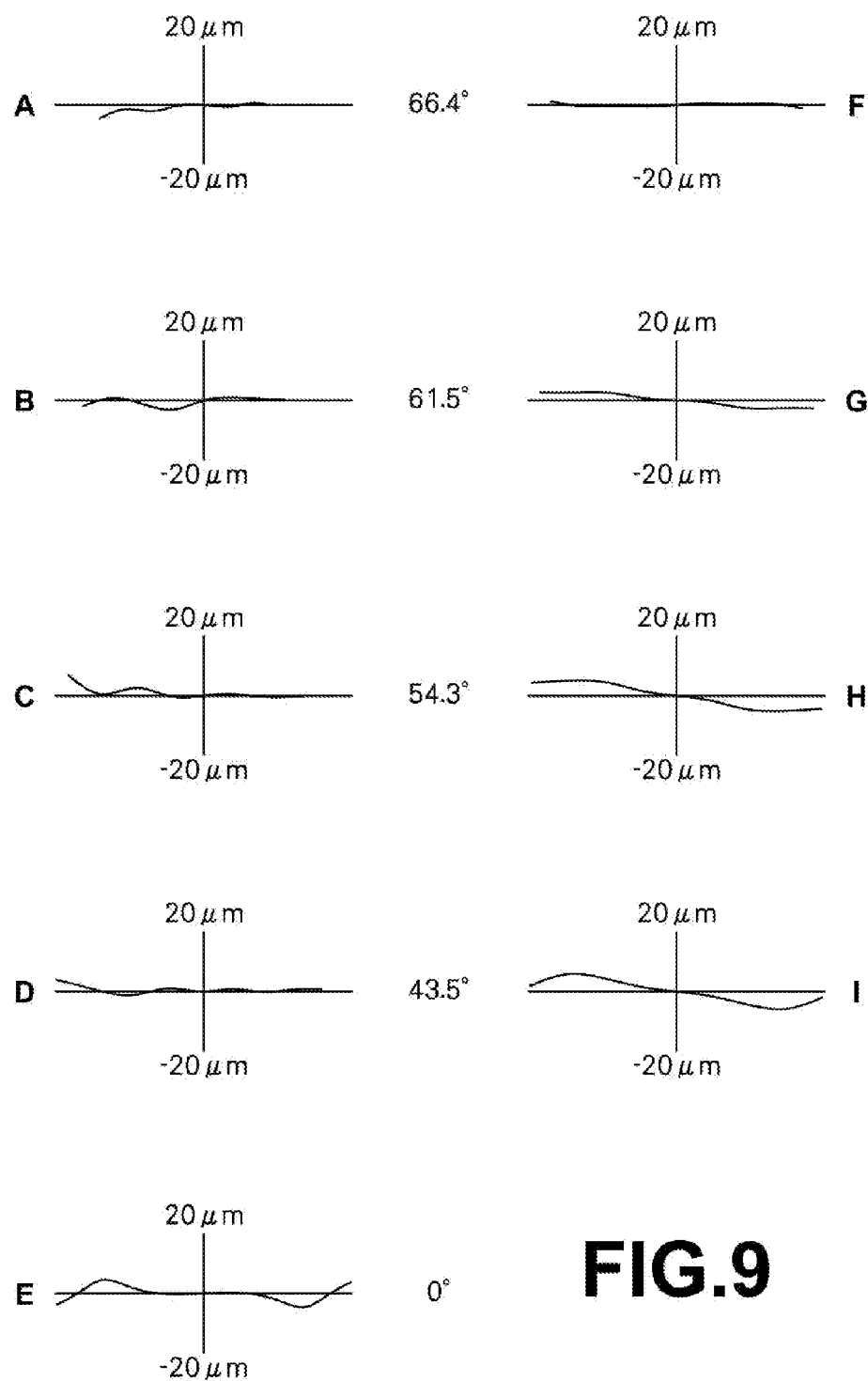
FIG. 9 shows, at A to I, lateral aberration diagrams of the wide-angle projection lens of Example 1 of the invention.

FIG. 9 shows, at A to E, lateral aberration diagrams in the tangential direction at individual half angles of view of the wide-angle projection lens of Example 1, and shows, at F to I, lateral aberration diagrams in the sagittal direction at the individual half angles of view of view of the wide-angle projection lens of Example 1. The lateral aberrations in the tangential direction and in the sagittal direction at the same half angle of view are shown side by side in the horizontal direction, and each numerical value shown between the lateral aberrations in the two directions represents the half angle of view. The aberration diagrams shown at A to D in FIG. 8 and at A to I in FIG. 9 show aberrations when the projection distance is infinity.

Figure 10:
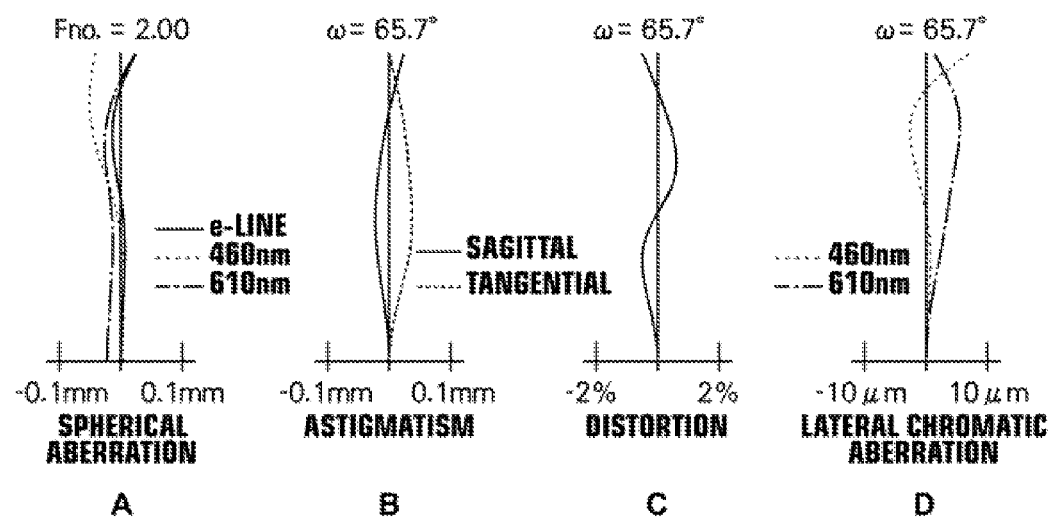
FIG. 10 shows, at A to D, aberration diagrams of the wide-angle projection lens of Example 2 of the invention.
Figure 11:
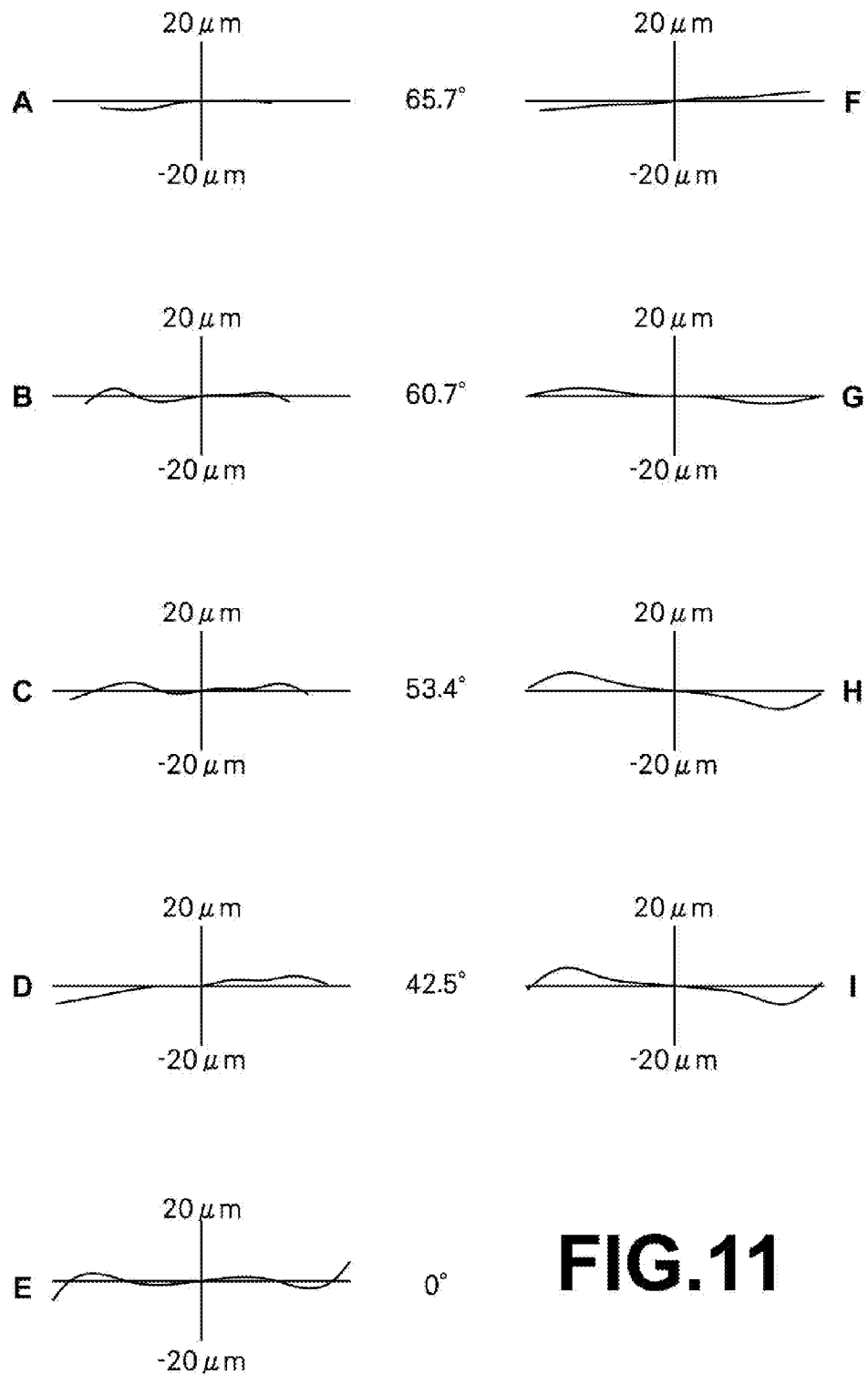
FIG. 11 shows, at A to I, lateral aberration diagrams of the wide-angle projection lens of Example 2 of the invention.
Figure 12:
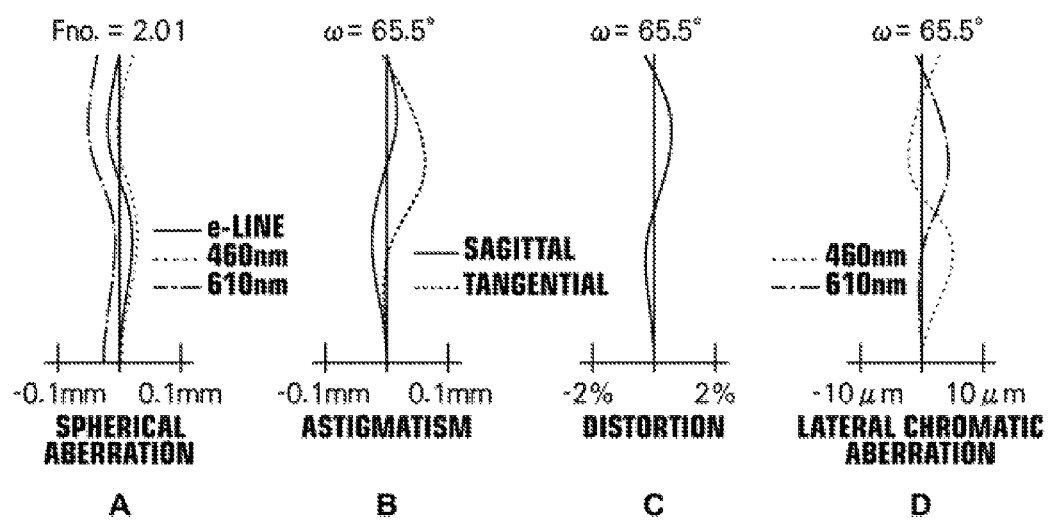
FIG. 12 shows, at A to D, aberration diagrams of the wide-angle projection lens of Example 3 of the invention.
Figure 13:
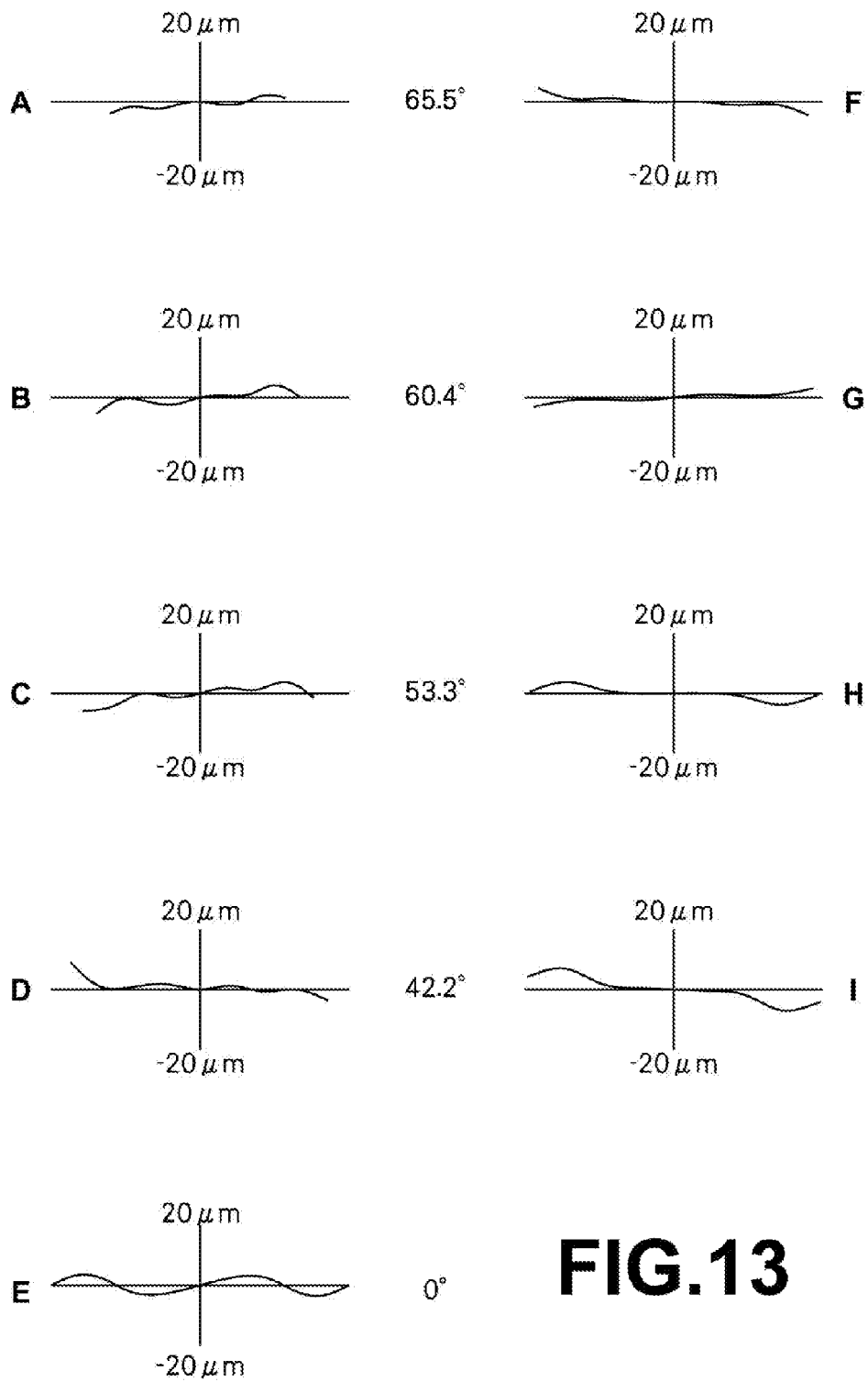
FIG. 13 shows, at A to I, lateral aberration diagrams of the wide-angle projection lens of Example 3 of the invention.
Figure 14:
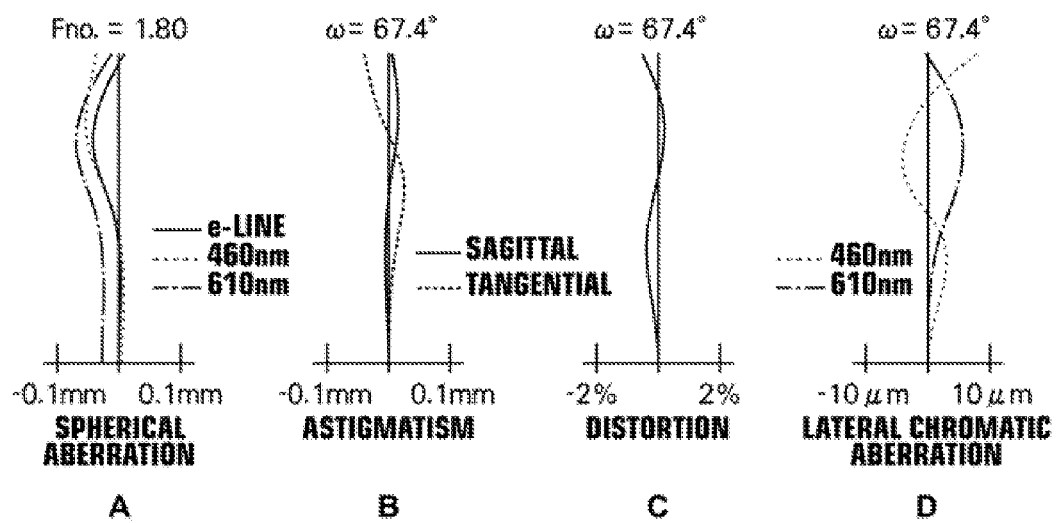
FIG. 14 shows, at A to D, aberration diagrams of the wide-angle projection lens of Example 4 of the invention.
Figure 15:
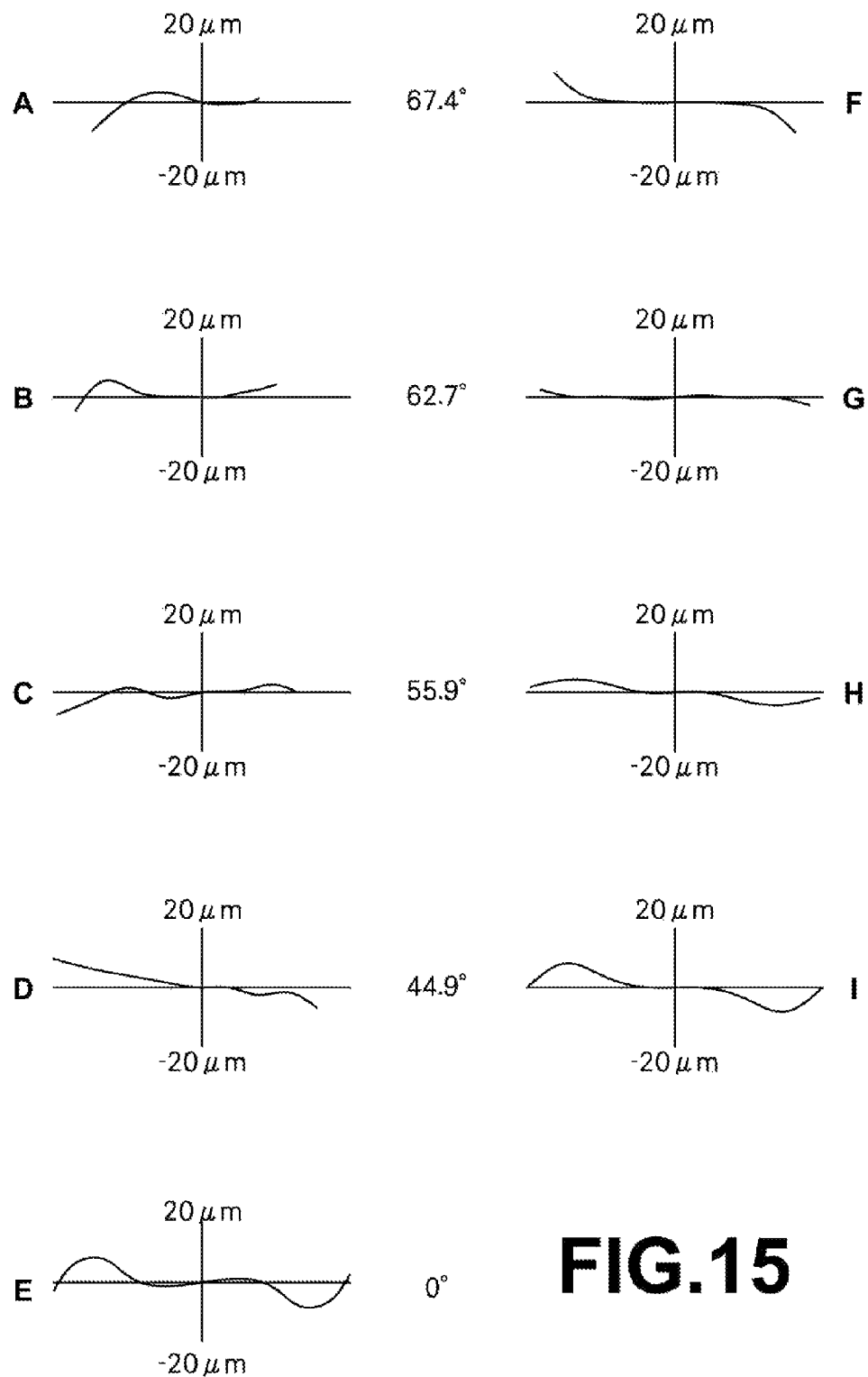
FIG. 15 shows, at A to I, lateral aberration diagrams of the wide-angle projection lens of Example 4 of the invention.
Figure 16:
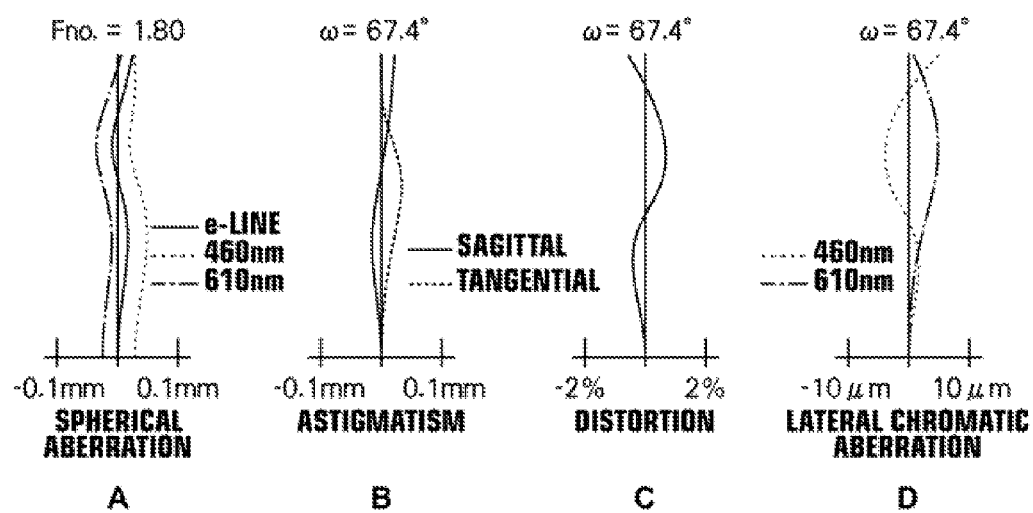
FIG. 16 shows, at A to D, aberration diagrams of the wide-angle projection lens of Example 5 of the invention.
Figure 17:
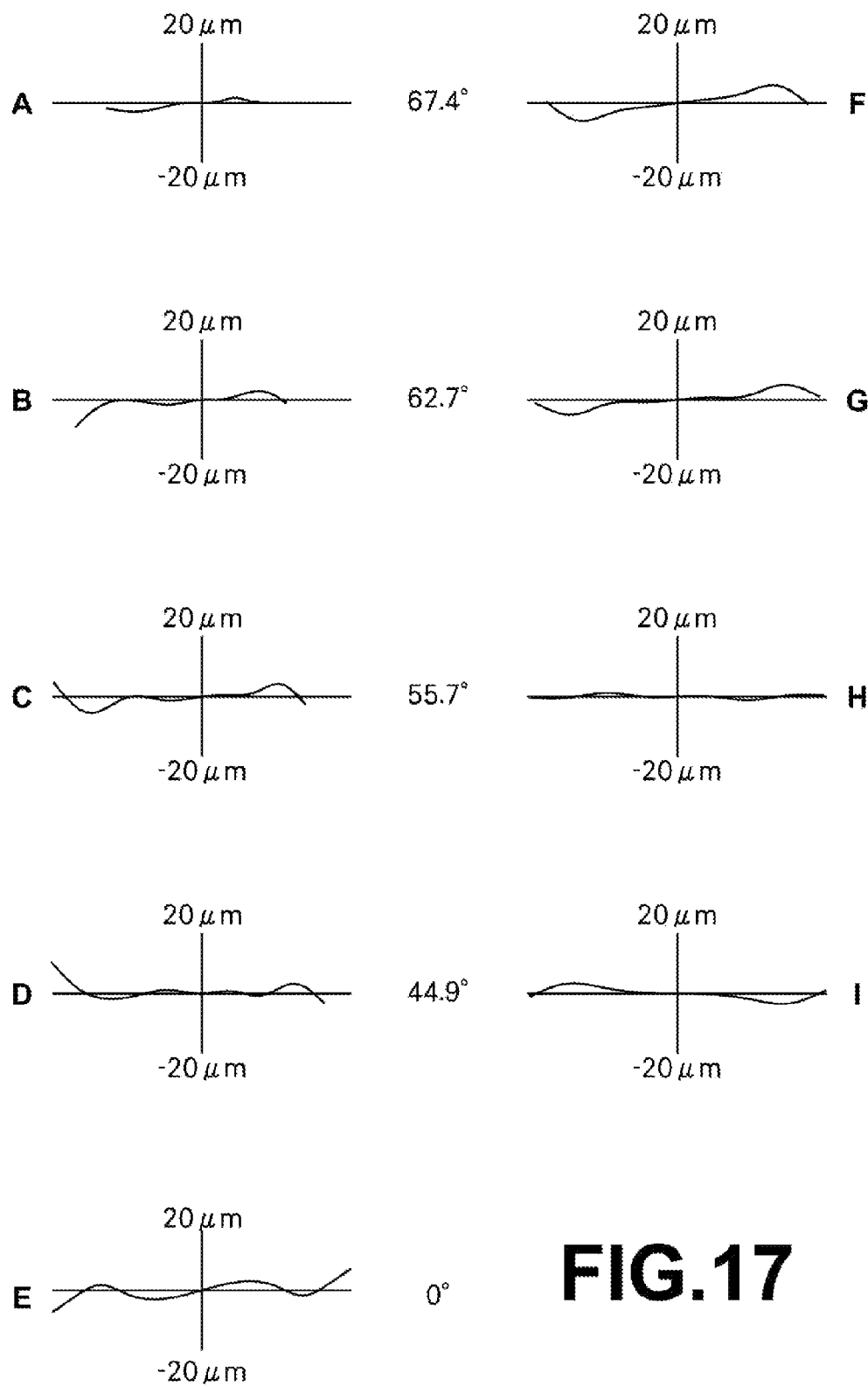
FIG. 17 shows, at A to I, lateral aberration diagrams of the wide-angle projection lens of Example 5 of the invention.
Figure 18:
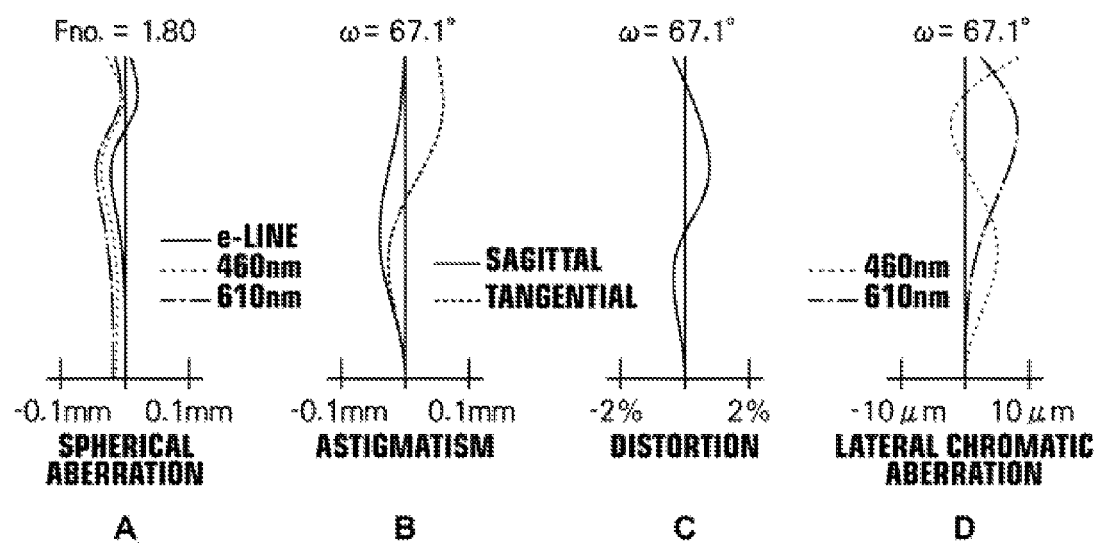
FIG. 18 shows, at A to D, aberration diagrams of the wide-angle projection lens of Example 6 of the invention.
Figure 19:
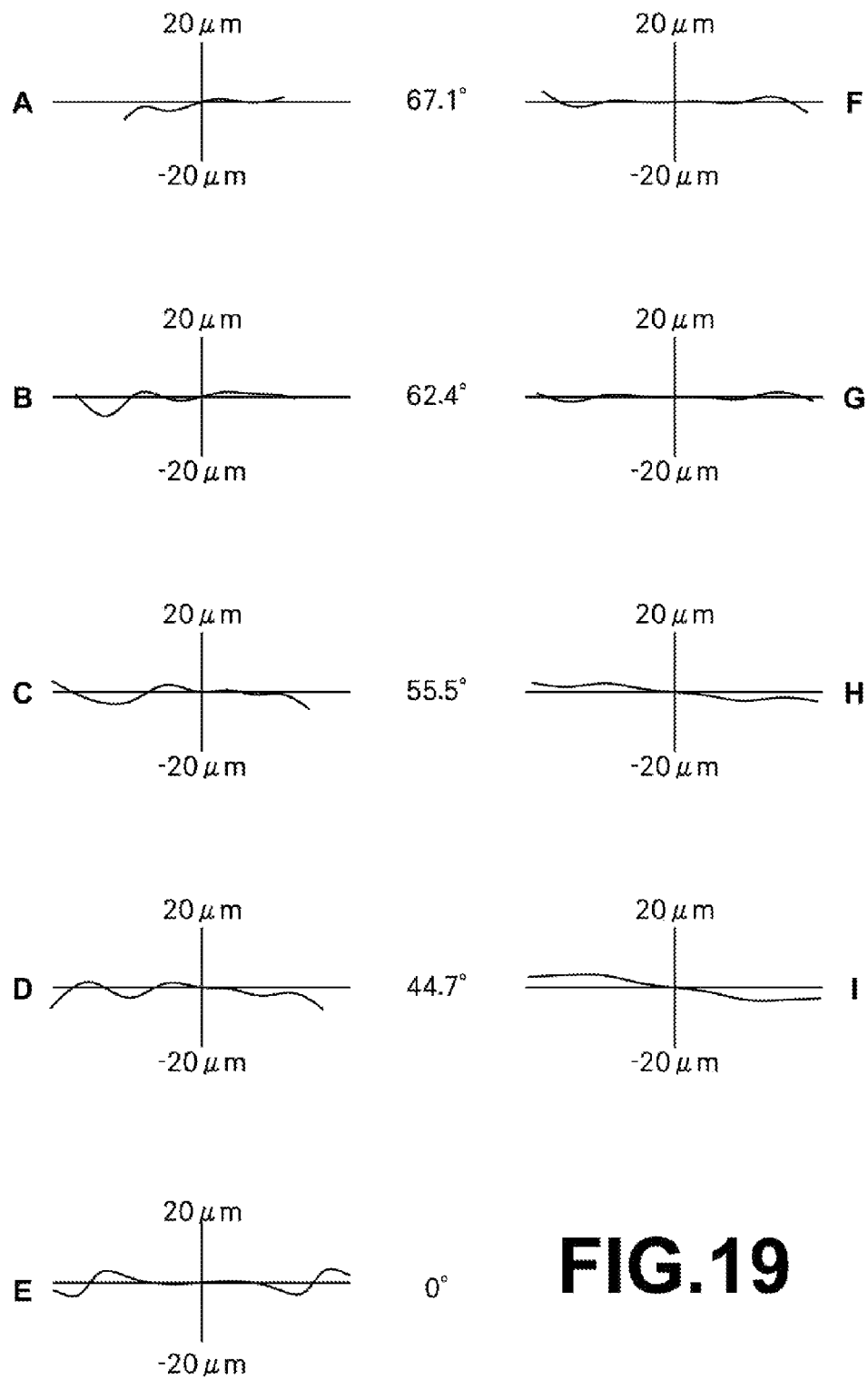
FIG. 19 shows, at A to I, lateral aberration diagrams of the wide-angle projection lens of Example 6 of the invention.
Figure 20:
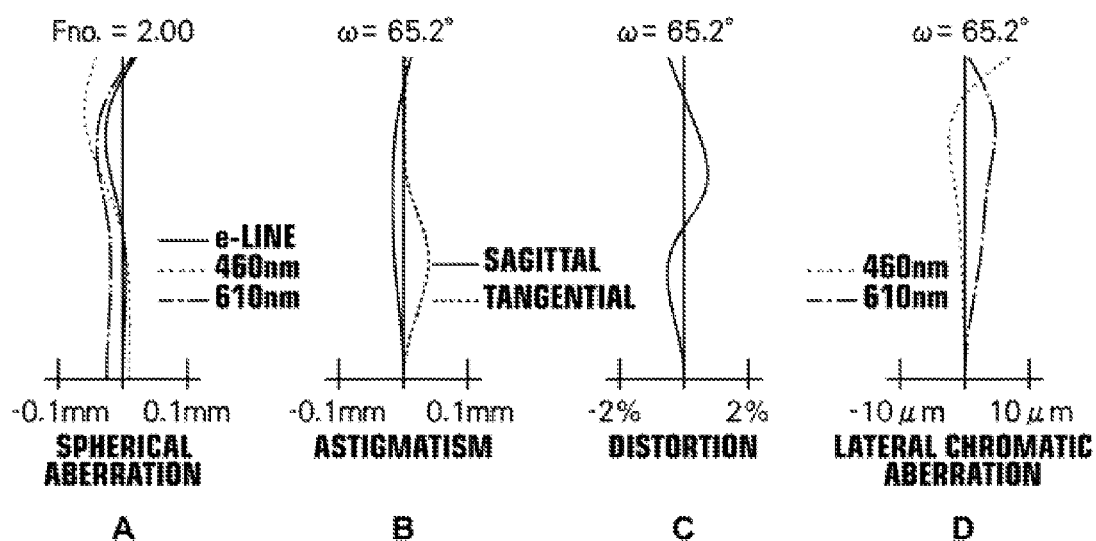
FIG. 20 shows, at A to D, aberration diagrams of the wide-angle projection lens of Example 7 of the invention.
Figure 21:
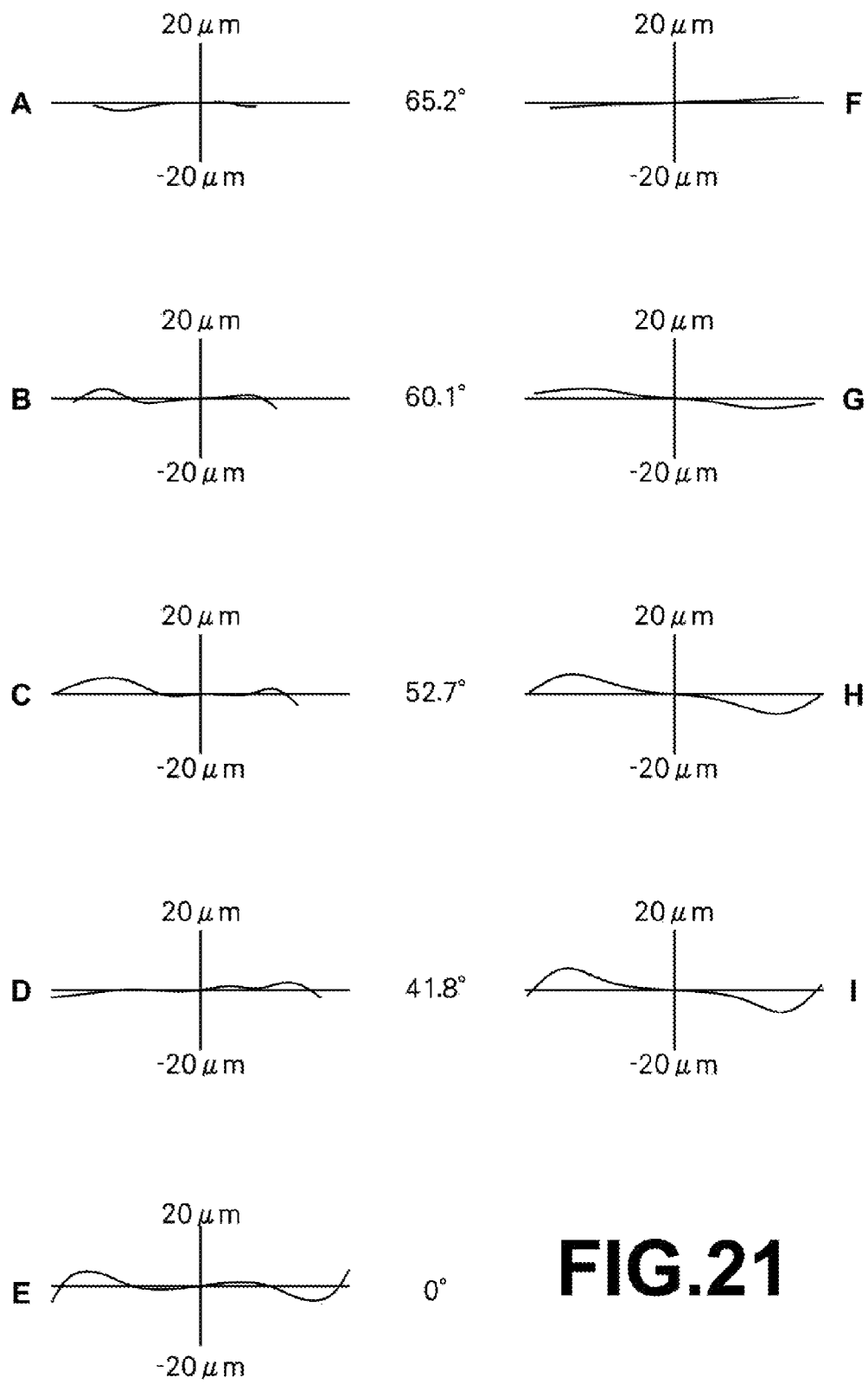
FIG. 21 shows, at A to I, lateral aberration diagrams of the wide-angle projection lens of Example 7 of the invention.

Similarly, aberration diagrams of the wide-angle projection lenses of Examples 2 to 7 are shown at A to D in FIG. 10, at A to I in FIG. 11, at A to D in FIG. 12, at A to I in FIG. 13, at A to D in FIG. 14, at A to I in FIG. 15, at A to D in FIG. 16, at A to I in FIG. 17, at A to D in FIG. 18, at A to I in FIG. 19, at A to D in FIG. 20, and at A to I in FIG. 21. It can be seen from these aberration diagrams that the wide-angle projection lenses of Examples 1 to 7 have successfully corrected aberrations.

The present invention has been described with reference to the embodiments and examples. However, the invention is not limited to the above-described embodiments and examples, and various modifications may be made to the invention. For example, the values of the radius of curvature, the surface interval, the refractive index, the Abbe number and the aspherical coefficients of each lens of the wide-angle projection lens of the invention may be changed as appropriate. Further, the light valves and the optical members used for light flux separation or light flux composition in the projection display device of the invention are not limited to those of the above-described configuration, and various modifications of the aspect may be made.

What is claimed is:

1. A wide-angle projection lens substantially consisting of, in order from an enlargement side: a first lens group comprising two aspherical lenses; a second lens group consisting of three negative meniscus lenses, each negative meniscus lens having a convex surface facing the enlargement side; a third lens group having a negative refractive power and comprising at least one cemented lens; and a fourth lens group having a positive refractive power and comprising at least two cemented lenses and one aspherical lens, wherein an interval between the third lens group and the fourth lens group is the longest interval among intervals between the lens groups next to each other of the entire system, and conditional expressions (1) to (3) below are satisfied:

$$-3.8 < f123/f < -1.6 \qquad (1),$$

$$6.6 < f4/f < 11.5 \qquad (2) \text{ and}$$

$$5.1 < Bf/f < 6.4 \qquad (3),$$

where f123 is a combined focal length of the first to the third lens groups, f is a focal length of the entire system, f4 is a focal length of the fourth lens group, and Bf is a back focus, which is an equivalent air distance, at the reduction side.

2. The wide-angle projection lens as claimed in claim 1, wherein conditional expression (1-1) below is satisfied:

$$-3.2 < f123/f < -1.8 \qquad (1\text{-}1).$$

3. The wide-angle projection lens as claimed in claim 1, wherein conditional expression (2-1) below is satisfied:

$$7.2 < f4/f < 9.4 \qquad (2\text{-}1).$$

4. The wide-angle projection lens as claimed in claim 1, wherein conditional expression (3-1) below is satisfied:

$$5.2 < Bf/f < 5.9 \qquad (3\text{-}1).$$

5. The wide-angle projection lens as claimed in claim 1, wherein conditional expression (4) below is satisfied:

$$2.0 < f2/f123 < 3.8 \qquad (4),$$

where f2 is a focal length of the second lens group.

6. The wide-angle projection lens as claimed in claim 5, wherein conditional expression (4-1) below is satisfied:

$$2.2 < f2/f123 < 3.2 \qquad (4\text{-}1).$$

7. The wide-angle projection lens as claimed in claim 1, wherein conditional expression (5) below is satisfied:

$$4.8 < f3/f123 < 11.3 \qquad (5),$$

where f3 is a focal length of the third lens group.

8. The wide-angle projection lens as claimed in claim 7, wherein conditional expression (5-1) below is satisfied:

$$5.4 < f3/f123 < 9.6 \qquad (5\text{-}1).$$

9. The wide-angle projection lens as claimed in claim 1, wherein the fourth lens group comprises three or more positive lenses made of a material having an Abbe number of 80 or more with respect to the d-line.

10. The wide-angle projection lens as claimed in claim 1, wherein focus control when a projection distance is changed is achieved by moving only the second lens group and the third lens group in an optical axis direction, and focus control when the projection distance is changed from a far distance to a near distance is achieved by moving the second lens group toward a reduction side and moving the third lens group toward the enlargement side.

11. The wide-angle projection lens as claimed in claim 1, wherein conditional expression (6) below is satisfied:

$$4.0 < d_{3\text{-}4}/f < 12.0 \qquad (6),$$

where $d_{3\text{-}4}$ is an interval between the third lens group and the fourth lens group along an optical axis when a projection distance is infinity.

12. The wide-angle projection lens as claimed in claim 11, wherein conditional expression (6-1) below is satisfied:

$$4.4 < d_{3\text{-}4}/f < 9.8 \qquad (6\text{-}1).$$

13. A projection display device comprising: a light source; a light valve; an illumination optical unit for guiding a light flux from the light source to the light valve; and the wide-angle projection lens as claimed in claim 1, wherein the light flux from the light source is subjected to optical modulation by the light valve and is projected onto a screen by the wide-angle projection lens.

* * * * *